(12) United States Patent
Naslund et al.

(10) Patent No.: US 7,568,234 B2
(45) Date of Patent: Jul. 28, 2009

(54) ROBUST AND FLEXIBLE DIGITAL RIGHTS MANAGEMENT INVOLVING A TAMPER-RESISTANT IDENTITY MODULE

(75) Inventors: Mats Naslund, Vallingby (SE); Karl Norrman, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 806 days.

(21) Appl. No.: 10/524,583

(22) PCT Filed: Dec. 19, 2002

(86) PCT No.: PCT/SE02/02432

§ 371 (c)(1),
(2), (4) Date: Feb. 15, 2005

(87) PCT Pub. No.: WO2004/017664

PCT Pub. Date: Feb. 26, 2004

(65) Prior Publication Data

US 2005/0278787 A1    Dec. 15, 2005

(30) Foreign Application Priority Data

Aug. 15, 2002    (SE)    .................................... 0202451

(51) Int. Cl.
*H04L 9/00*    (2006.01)
(52) U.S. Cl. ........................................................ 726/26
(58) Field of Classification Search ................ 713/187;
726/26; 380/240–244
See application file for complete search history.

(56) References Cited

U.S. PATENT DOCUMENTS

2002/0073177 A1    6/2002    Clark et al.
2004/0117500 A1 *    6/2004    Lindholm et al. ........... 709/231
2004/0249768 A1 *    12/2004    Kontio et al. ................. 705/65

FOREIGN PATENT DOCUMENTS

WO    WO 02058453 A2    8/2002
WO    WO 02084980 A1    10/2002

OTHER PUBLICATIONS

Swedish Patent Office, International Search Report for PCT/SE02/02432, dated May 16, 2003.

* cited by examiner

*Primary Examiner*—Kambiz Zand
*Assistant Examiner*—Shahrouz Yousefi
(74) *Attorney, Agent, or Firm*—Roger S. Burleigh

(57) ABSTRACT

The invention relates to digital rights management, and proposes the implementation of a DRM agent (125) into a tamper-resistant identity module (120) adapted for engagement with a client system (100), such as a mobile phone or a computer system. The DRM agent (125) is generally implemented with functionality for enabling usage, such as rendering or execution of protected digital content provided to the client system from a content provider. In general, the DRM agent (125) includes functionality for cryptographic processing of DRM metadata associated with the digital content to be rendered. In a particularly advantageous realization, the DRM agent is implemented as an application in the application environment of the identity module. The DRM application can be preprogrammed into the application environment, or securely downloaded from a trusted party associated with the identity module. The invention also relates to a distributed DRM module, with communication between distributed DRM agents (125, 135) based on usage-device specific key information.

44 Claims, 12 Drawing Sheets

ROBUST AND FLEXIBLE DIGITAL RIGHTS MANAGEMENT INVOLVING A TAMPER-RESISTANT IDENTITY MODULE

TECHNICAL FIELD OF THE INVENTION

The present invention relates to digital rights management (DRM) for managing digital content ordered and distributed over networks such as the Internet.

BACKGROUND OF THE INVENTION

The distribution of digital content or media data using modern digital communication technologies is constantly growing, increasingly replacing more traditional distribution methods. In particular, there is an increasing trend of downloading or streaming digital content from a content provider to a user, which then typically renders or executes the content using a rendering or executing device according to some usage rights or rules specified in a license associated with the digital content. Due to the advantages of this form of content distribution, including being inexpensive, fast and easy to perform, applications can now be found for distribution of all types of media such as audio, video, images, electronic books and software.

However, with this new way of distributing digital media content comes the need for protecting the content provider's digital assets against unauthorized usage and illegal copying. Copyright holders and creators of digital content naturally have a strong economic interest of protecting their rights, and this has lead to an increasing demand for digital rights management (DRM). DRM is generally a technology for protecting the content provider's assets in a digital content distribution system, including protecting, monitoring and restricting the usage of the digital content as well as handling payment. A DRM system thus normally includes components for encryption, authentication, key management, usage rule management and charging.

The most basic threats to a DRM system include eavesdropping, illegal copying, modification of usage rules, and repudiation of order, delivery or usage of content. Most of these basic security problems are solved by standard cryptographic techniques, including encryption, authentication and key management. However, what basically distinguishes the security problems of a DRM system from other general security problems is that not even the other end-part of the communication (the end user) is completely trusted. In fact, the end-user might want to try to fraudulently extend his usage rights, for example rendering the media content more times than he has paid for or illegally copying the digital content to another rendering or executing device. Therefore, some form of rule-enforcement is required in the user's rendering or executing device. To this end, a tamper-resistant circuit and some formal language, such as XrML, expressing the usage rules are commonly used together with the basic cryptographic techniques mentioned above.

Unfortunately, it now and then happens that the algorithms in the tamper-resistant DRM circuits are hacked, and a piece of software that successfully cracks some vital part of the DRM security of a particular type of rendering device is openly distributed. From the viewpoint of the content provider, this makes all the rendering devices of this type unsecure for DRM purposes, and the content provider may have to stop providing digital content intended for these rendering devices, and instead use another algorithm that has not yet been hacked. Recalling and replacing all the concerned rendering devices is obviously very expensive for the manufacturer/content provider.

A robust DRM system will make copyright holders more willing to distribute their material and offer a wider selection of content for end users over open, untrusted channels such as the Internet. It will also provide business opportunities for network operators to provide the infrastructure for distribution, charging mechanism and so forth.

Another problem is that it is often difficult, sometimes even impossible, to move media content from one rendering or executing device to another. The media usage license is often associated with a single device, and if the user wants to use the content in another device, he needs a new license. This is a cumbersome procedure for the end-user, and reduces the flexibility in the user's media system.

SUMMARY OF THE INVENTION

The present invention overcomes these and other drawbacks of the prior art arrangements.

It is a general object of the present invention to provide a robust and flexible DRM system.

It is another important object of the invention to provide tools for a very flexible and relatively secure client solution for digital rights management (DRM).

Yet another object of the invention is to provide a DRM mechanism allowing a network operator or corresponding party to be more active in establishing and maintaining proper DRM functionality.

It is also an object of the invention to be able to reuse existing infrastructure in designing a DRM system.

These and other objects are met by the invention as defined by the accompanying patent claims.

A basic idea according to the invention is to implement a digital rights management (DRM) agent into a tamper-resistant identity module that is adapted for engagement, preferably physical engagement, with a client system being capable of receiving and using digital content. The client system typically has a network interface for receiving digital content over a network, and a digital-content usage device such as a rendering device. The digital content is normally protected by the content provider, and transmitted in encoded form to the client, which needs to decode the protected digital content before usage of the content will be possible. It may also be the case that the protected digital content is not transmitted to the client system at all until charging has been performed or can be satisfactorily guaranteed. The DRM agent implemented in the tamper-resistant identity module generally includes functionality for enabling usage of ordered digital content, and without such a DRM agent, the client system will simply not be able to use the digital content.

Hence, the DRM agent implemented in the tamper-resistant identity module may for example be provided with functionality for performing DRM processing to extract a proper content protection key and/or to enable charging for usage of digital content.

The tamper-resistant identity module preferably comprises a module, perhaps even DRM internal, for performing at least relevant parts of an authentication and key agreement (AKA) procedure, and the DRM agent in the identity module may perform DRM processing based on information from the AKA procedure. For example, authentication information can be used for charging purposes, and key agreement information can be used for extracting a content protection key securely transferred to the client system. The AKA procedure is generally performed based on one or more identity-module specific keys tamper-resistantly stored in the identity module. This could for example be a symmetric key shared between the identity module and a network operator, a private key associated with the identity module, and/or even a DRM specific key.

The identity module can be any tamper-resistant identity module known to the art, including standard SIM cards used in GSM (Global System for Mobile Communications) mobile telephones, UMTS (Universal Mobile Telecommunications System) SIM (USIM), WAP (Wireless Application Protocol) SIM, also known as WIM, ISIM (IP Multimedia Subsystem Identity Module) and, more generally, UICC (Universal Integrated Circuit Card) modules. It is especially noted that the invention fits into the current version of the emerging OMA (Open Mobile Alliance) standard.

Although the invention is particularly suitable for mobile units and mobile DRM, the invention is not limited to network subscriber identity modules used with mobile phones and communicators. For example, the tamper-resistant identity module may be a smart card associated with a set-top box for satellite TV or a tamper-resistant identity module for a general digital home entertainment center. The invention can in fact be used with any client, including conventional PC (Personal Computer) systems.

When using standardized SIM, USLM, VVIM, ISIM and UICC modules, the DRM agent may have a logical or physical interface to authentication and keying algorithms pre-existing on the identity module, reusing the subscriber-operator relation manifested by a subscription key. The subscriber-operator relation is typically also used for charging purposes in the overall DRM system.

It has been recognized that it is particularly advantageous to implement the DRM agent as an application in an application environment provided in the tamper-resistant identity module, preferably the identity module application toolkit environment. The DRM agent application can be preprogrammed into the toolkit application environment, or securely (preferably authenticated and encrypted) downloaded over a network from an external trusted party associated with the identity module. The application toolkit environment is not the same as a true tamper proof encapsulated circuit, but it is far more secure than performing the DRM processing in an open, and perhaps even hostile PC environment, and more flexible than using hard-wired tamper resistant circuits. For example, if a security flaw is found or if the whole DRM agent is hacked, the functionality is easily replaced or upgraded (even over the air interface) by a new DRM agent. It should be understood that although a software agent is particularly beneficial, it is also possible to have the DRM agent premanufactured as hardware in the identity module.

The proposed solution provides increased flexibility for the end-user as well as the content provider and/or network operator. The identity module is easily replaceable (even remotely upgradeable), "portable" between different rendering or executing devices as well as relatively secure.

For business models in which the usage of the digital content is restricted, the DRM agent in the tamper-resistant identity module is preferably configured for enabling only controlled usage of the ordered digital content. For example, the DRM agent in the identity module may include functionality for enforcement of usage rules associated with the digital content.

Especially when the digital-content usage device is a stand-alone device in the client system, the usage device is also provided with a DRM agent. In this case, it is recommendable to configure the DRM agent in the identity module in such a way that it enables usage of the digital content only by a usage device having a DRM agent that properly enforces the usage rules associated with the digital content. In this scenario, the overall DRM functionality of the client system is actually distributed, with a first DRM agent in the identity module and a second DRM agent in the usage device. The communication between the two DRM agents is preferably based on usage-device specific key information. In this way, the communication between the two DRM agents can be authenticated and/or protected. In the case of authenticated communication, the main objective is to authenticate the usage device in order to verify that the usage device has valid DRM functionality. In the case of protected communication, secure transfer of DRM metadata such as the content-protection key between the first DRM agent and the second DRM agent can be ensured.

The first DRM agent in the identity module is thus preferably provided with functionality for enabling registration of digital-content usage devices, storing usage-device specific key information for each usage device. The registration of usage devices is particularly important when the identity module is moved between different usage devices, or when using stand-alone digital-content usage equipment.

The invention gives a network operator or corresponding party the possibility to be more active in establishing and maintaining proper DRM functionality on the client side, using the tamper-resistant identity module as a common point of trust. The identity module thus acts as a central mediator of DRM associated data and/or functions. The operator, content provider and/or corresponding party is given the possibility to fully control the DRM functionality, in both the tamper-resistant identity module and the interrelated usage device. In this respect, it is also beneficial to have the network operator (in processing a media order) and/or a content provider (in processing a request for content) authenticate that the identity module used with the client system includes a compliant/valid DRM agent. In particular, the content provider may be interested in verifying that the usage device is associated with compliant/valid DRM functionality. This can be achieved by relying on the operator/identity module authentication, implicitly authenticating the usage device.

The invention offers the following advantages:

From the end-user point of view, the invention provides flexible and upgradeable implementation of DRM agents, as well as "portability" between different rendering or executing devices.

A manufacturer of usage devices such as rendering devices (players) can easily configure players to run with an external DRM agent.

A network operator or corresponding party can efficiently manage and upgrade DRM agents connected to the network, and the invention also opens up new business possibilities for the operator acting as a trusted center for content distribution.

A network operator or corresponding party is given the possibility to be more active in establishing and maintaining proper DRM functionality on the client side.

A DRM system built on the invention can reuse existing infrastructure.

The DRM functionality on the client side is relatively secure, while at the same time flexibly adaptable to upgrades.

Basing device registration on an identity module has the benefit of allowing the establishment of a "home domain", while making it possible for a network operator to prevent different users from forming a "global virtual domain".

Other advantages offered by the present invention will be appreciated upon reading of the below description of the embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION OF EMBODIMENTS OF THE INVENTION

Figure 1:
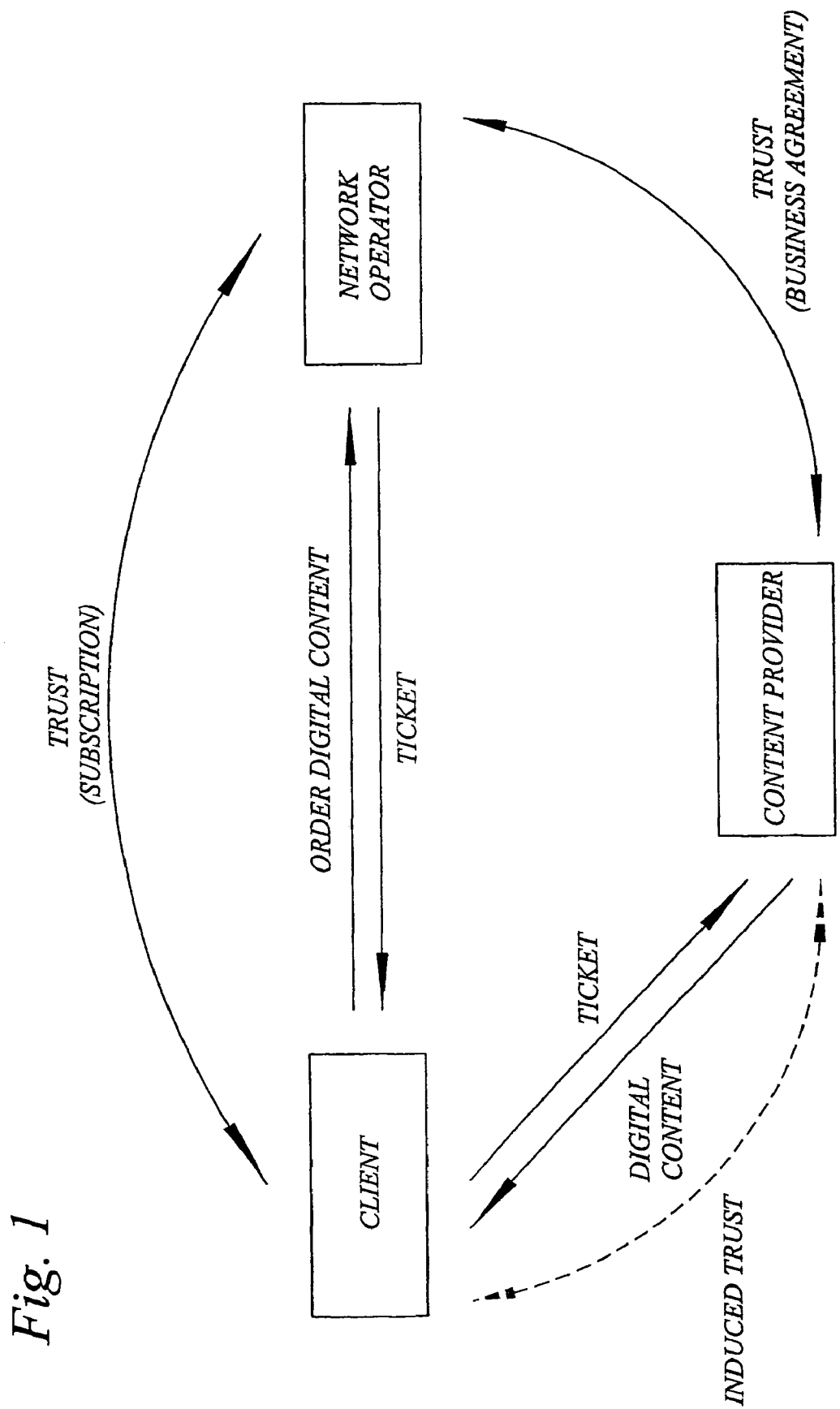
FIG. 1 is an overview of a digital rights management system for ordering digital content over a network illustrating the relevant parties and their mutual relationships.

Throughout the drawings, the same reference characters will be used for corresponding or similar elements.

The present invention is generally applicable to digital rights management (DRM) used in a digital content ordering and distribution system. In such ordering and distribution system, digital content or media is provided from a content provider to a client over a network, e.g. Internet and/or a wireless network for mobile communication, managed by a network operator. In order to facilitate understanding of the invention, a brief discussion of some general DRM functions follows. As was mentioned in the background section, DRM is used for protecting the copyright holders' assets in a digital content ordering and distribution system. In such a system, DRM typically regards authentication and key management usage rights management including enforcement, and charging. These DRM functions are implemented in DRM modules arranged in the relevant parties, i.e. for example in a client system, in a server of the network operator and in a media or content server of the content provider.

Starting with authentication and key management, authentication is used to identify the parties in the digital content ordering and distribution process. Techniques well known in the art, such as message, user and/or device authentication and digital signatures using cryptographic keys [1], may be employed for authentication. In addition, techniques for marking or stamping digital content, so that it can be tracked during the delivery process and subsequent usage, may be used. Watermarking and fingerprinting are two techniques that usually are employed for content marking. The DRM modules in the system also transport, store and generate, in a secure way, cryptographic keys for use in the digital content ordering and distribution process. The keys are employed for cryptographically protecting messages, including the actual digital content, during the delivery over the network.

The DRM modules also perform usage rule management, including rule-enforcement. The ordered digital content is associated with a license or digital permit specifying the client's usage rules and rights of the obtained digital media. This form of management is about the digital content itself and deals with issues such as, who gets it, how is it delivered, how may it be used, how many times may it be used (rendered, executed, saved, forwarded, copied and/or modified), how long does the rights last, who gets paid, how much they get paid and how. Some or all of these issues are specified in the license, which may be delivered together with the digital content. In order to describe the usage rules, special languages called rights languages have been developed. Two of the most prevalent rights languages used today are Rights Markup Language (XrML) and Open Digital Rights Language (ODRL). In the client's rendering or executing device, the DRM module is implemented to ensure that the usage, most often rendering, follows what is described in the usage rules and to prevent repudiation of the digital content and the usage rules.

Finally, charging management generally refers to the procedure of the actual payment for usage of the digital content. Several different techniques can be used, such as credit card techniques for payment over Internet, payment through a subscription or a pre-paid account, or even by using "electronic cash". A DRM system may also include management of tickets representing a value that can be redeemed and entitle the ticket owner access to specified digital content. The usage rights associated with ordered digital content is thus generally not limited to actual "usage" such as rendering, copying, forwarding and so on, but may also include redemption of the ticket value or parts thereof.

An example of a digital content ordering and distribution system incorporating DRM functions is schematically depicted in FIG. 1, which illustrates the relevant parties and their mutual relationships. The exemplary system of FIG. 1 includes a client having access to a network through an agreement, e.g. a subscription, with a network operator. This client-operator trust relation is usually manifested in a cryptographic relationship, i.e. sharing symmetric keys or having access to each other's public keys (certified by a commonly trusted party) if asymmetric cryptography is used. A trust relationship is also present between the network operator and the content provider, but in the form of a business agreement. This agreement could be manifested by a similar key sharing and/or key access as described for the client and network operator above. However, between the client and the content provider, an induced trust relationship is established each time the client obtains digital content from the content provider. This induced trust is manifested in a session key used for cryptographically protecting the digital content as it is transmitted to the client over the network.

In a typical content ordering and distribution process, the client first connects to the network operator. The operator then authenticates the client and possibly verifies that the client has a valid DRM agent for managing DRM metadata, such as usage rules, encrypted data and keys, associated with the digital content. The client selects digital content or media, and accepts/selects usage rules valid for the media, for example allowing rendering the media a selected number of times or during a given period of time. The basic usage rules are generally determined by the content provider, but some aspects of the usage rules may be open for user-selection. In the present description, digital content refers to digital data that can be downloaded or streamed over a network for usage in a client system, and thus includes for example audio, video, images, electronic books and other electronic text material as well as software (application programs, computer games, and so forth). Other types of usage of the digital content than rendering or execution includes forwarding, saving, copying, printing and possibly modifying the digital content. In the following, the invention will mainly be described with reference to rendering of digital content. It should though be understood that the invention is not limited to rendering of audio, video and text, but covers any usage or consumption of media content, including execution of application programs and computer games.

An order is then placed to the operator, which writes and secures/protects a ticket specifying the ordered content and the usage rules. The ticket is sent to the client, where the DRM agent authenticates and decrypts the ticket and extracts a session key from the received ticket. The ticket can be decrypted by conventional cryptographic means, e.g. using a symmetric key associated with the client and the network operator or a private key of the client. This decryption key is preferably the client-operator subscription key, a special DRM key associated with the DRM agent, or a key derived from one or both of these keys. The extracted session key will eventually be used for decrypting the digital media from the content provider. The client also receives a copy of the ticket encrypted with the operator-content provider agreement key (or a key derived therefrom). This ticket copy is forwarded to the content provider, where the session key is extracted after the validity of the ticket has been checked. Thereafter, the content provider delivers the ordered digital content cryptographically protected by the session key to the client, either as downloaded data or streaming data. Finally, the digital content is decrypted in the client by the previously extracted session key. The digital content can now be used, e.g. rendered or executed, by the client or an associated device according to the usage rules. Further information regarding DRM systems and ordering and distribution of digital content can be found in [2], as well as in [3].

The overall content ordering and distribution process discussed above is merely given as a simplified example for conveying a general image of such processes. In order to increase the security, more authentication and cryptographic steps may be introduced. In addition, the client should pay for the ordered content, so billing and charging steps are most often present in the ordering process. Such a charging may be performed by a subscription to the network operator, by sending the client's credit card number to the network operator or to a dedicated billing institute managing the charging of digital content, or by some other means. In addition, the network operator may provide both network services and the digital content and may hence act as both operator and content provider at the same time. However, the operator then typically has a dedicated content server and dedicated authentication/charging server(s), so that the parties illustrated in FIG. 1 are present although the network operator also manages the content providing services. In some applications, e.g. WAP (Wireless Application Protocol) applications, it is also possible that another client may act as a content provider. The usage rules are then pushed to the content-receiving client from the network operator or the content provider.

It has been recognized that a partial solution to the objective problems addressed in the background section may be to use a portable tamper-resistant device that can be moved between rendering or executing devices. However, if a user buys a new device, there is typically some cumbersome set-up procedure before the new device can be used.

The basic idea according to the invention is to implement a DRM agent in a tamper-resistant identity module that is intended for cooperation with a client system, such as a mobile phone or a computer system. Preferably, the tamper-resistant identity module is provided as a smart card or equivalent, which is adapted for physical engagement with appropriate parts, such as a card slot, of the client system. The DRM agent is generally implemented with functionality for enabling usage, such as rendering or execution, of protected digital content provided to the client from a content provider.

The usage is preferably controlled by usage rules associated with the digital content. Typically, the DRM agent includes functionality for cryptographic processing of DRM metadata associated with the digital content to be rendered. This metadata may for example be key(s) and user data such as the encrypted digital content itself. For example, the DRM agent may include some basic functionality for more or less directly generating or extracting a decryption key to be used for decrypting the encrypted digital content. It is also possible to integrate the actual decryption of the digital content into the DRM agent, as well as functionality for rule-enforcement and for enabling charging.

The identity module may be any tamper-resistant identity module known to the art, including standard SIM cards used in GSM mobile telephones, UMTS SIM, WIM and ISIM modules, as well as general UICC modules.

In the following, the invention will mainly be described with reference to a network subscriber identity module such as an SIM, USIM, WIM, ISIM or UICC module. Although the invention is particularly useful for mobile DRM based on a network subscriber identity module, it should be understood that the invention is not limited thereto. The identity module could alternatively be issued by a non-telecommunication actor and provided, for example, as a smart card issued by a bank to its customers, or as an identity module associated with a set-top box for satellite TV or more generally for a digital home entertainment center.

By implementing the DRM agent in a network subscriber identity module such as an SIM, USIM, WIM, ISIM or UICC module, the DRM agent is potentially more secure than in an open and perhaps even hostile PC environment. This is because the operating system platforms of PCs, e.g. Windows and Linux, are more well known by the public than corresponding platforms of SIM, USIM, WIM or ISIM modules, which thereby become harder to attack and modify. Due to the inherent tamper-resistance of such network subscriber identity modules, a proper security configuration will be hard to override.

The fact that the subscriber identity module normally is removably arranged in relation to the client system makes it easy to move the identity module, with its DRM agent, between different devices, and also facilitates replacement of the DRM agent if it should be hacked.

Although the DRM agent may be implemented as special hardware in the network subscriber identity module, the currently most preferred implementation concerns a software-based DRM agent. It has been recognized that it is particularly advantageous to implement the DRM agent as an application in an application environment of the identity module, preferably the network subscriber identity module's application toolkit environment, such as the GSM SIM Application Toolkit (SAT) or the UMTS SAT (USAT) environment. The DRM agent application can be preprogrammed into the application toolkit environment, or securely (preferably authenticated and encrypted) downloaded, or more generally loaded, from a network operator associated with the subscriber identity module. The SAT, USAT or equivalent application toolkit provides an environment that can easily be upgraded with new software in a secure way, more of which will be described below.

In addition, the mobile operator's infrastructure can be used to solve the set-up problems associated with using the DRM agent with new rendering devices, as will be explained later on.

Figure 2A:
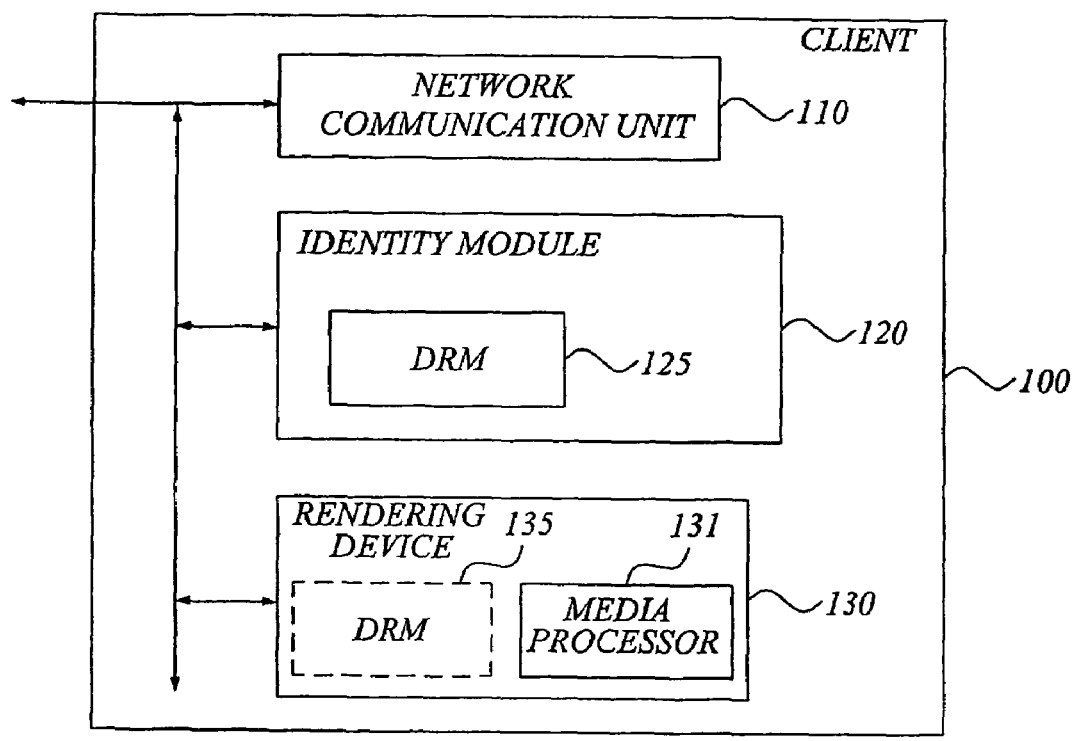
FIG. 2A schematically illustrates a client system according a preferred embodiment of the present invention.

FIG. 2A schematically illustrates a client system according a preferred embodiment of the present invention. The client may be any form of appliance or system, which may order and obtain digital content over a network, for example a mobile phone with an identity module removably arranged in a card slot, or a personal computer equipped with a card reader into which such an identity module is inserted. In this exemplary embodiment, the client system 100 comprises a network communication unit 110, a tamper-resistant identity module 120 and a digital-content usage device, here illustrated as a rendering device 130. The network communication unit 110 implements a network communication protocol stack, and thus enables downloading or streaming of digital content from a content provider to the client, using wireless or non-wireless network communication.

As mentioned above, the tamper-resistant identity module 120 comprises a DRM agent 125 implemented in hardware, software or a combination thereof. The rendering device 130 could also be implemented in software, hardware or a combination thereof. Preferably, the rendering device 130 includes a media processor 131, which may be software-implemented, for rendering the digital content using e.g. a screen or a loudspeaker, depending on the type of digital content. The rendering device 130 usually comprises some form of DRM functionality 135, for example rule-enforcement and typically also decryption of the protected media content based on a key generated by the DRM agent 125 implemented in the identity module 120.

The rendering device may be integrated into a mobile unit or a PC, but can also be provided as a stand-alone device directly (via suitable communication ports) or indirectly connected thereto. In the latter stand-alone case, the client may have one unit for downloading or streaming of digital content and another physically separate unit for actually using or rendering the digital content, i.e. the rendering device. The downloading or streaming unit may e.g. be a personal computer or mobile unit with suitable hardware/software for receiving the digital content. The content is then preferably transmitted to the rendering device via ordinary cables or by wireless communication with or without involving a network. Typical stand-alone rendering devices include Mp3 players, MD players, CD players, DVD players, other mobile units or PCs. Alternatively, the rendering device has its own network communication interface for receiving protected digital content and possibly also usage rules associated therewith.

Figure 2B:
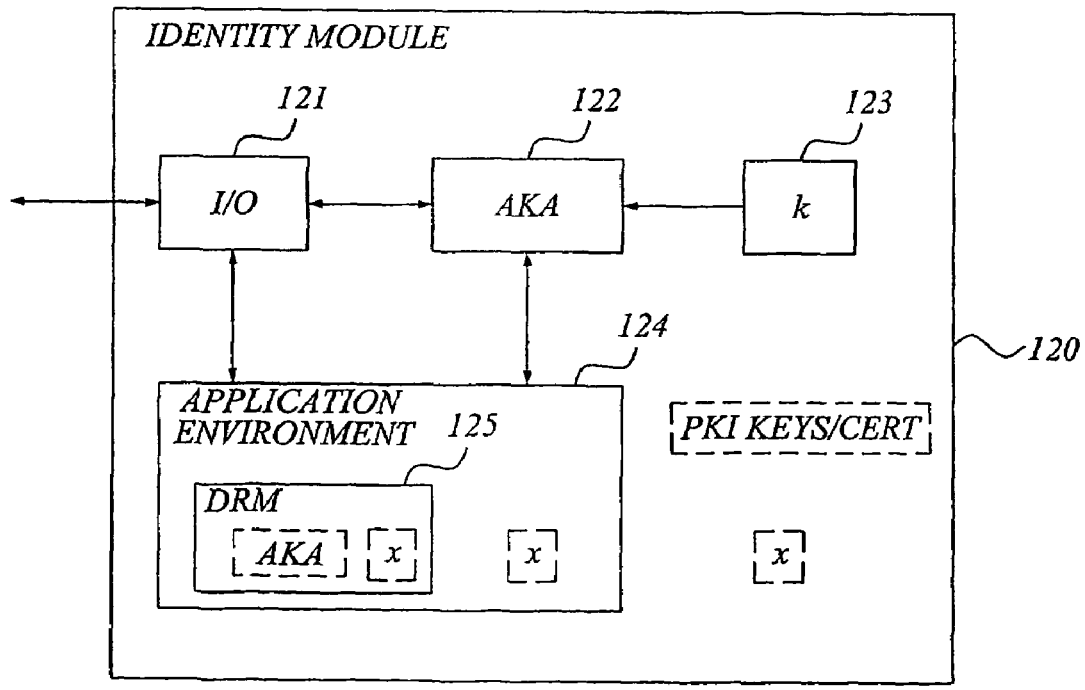
FIG. 2B schematically illustrates a tamper-resistant identity module according a preferred embodiment of the present invention.

As mentioned above, the DRM agent may be implemented as a software application in the tamper-resistant identity module, as schematically illustrated in FIG. 2B. The identity module 120 preferably comprises an input/output unit 121, an AKA (Authentication and Key Agreement) module 122, a subscriber or subscription key k 123 as well as an application environment 124. The I/O unit 121 parses commands sent to the identity module and handles communication with the internal functions. The AKA module 122 comprises algorithms for mutual authentication between client and network, and for deriving keys. This AKA function typically uses an identity-module specific key, e.g. the subscription key k associated with the client-operator subscription, a key derived therefrom or a key x associated with the DRM agent 125 implemented in the identity module. In GSM, for example, the AKA function is generally supported by the A3/A8 AKA algorithms. It is also possible to use asymmetric cryptography for authentication purposes.

In general, authentication and key agreement (AKA) procedures can be more or less sophisticated, ranging from very simple AKA, with a key agreement procedure where the secret key information is used directly as a session key, to more complex and secure AKA algorithms.

The application environment 124 is advantageously provided by the application toolkit of the identity module. For a GSM SIM, the application environment may be provided by the SIM Application Toolkit (SAT) [4], whereas the analogue application environment of UMTS SIM (USIM) is provided by UMTS SAT (USAT) [5].

For a GSM SIM, the SIM-ME (SIM-Mobile Equipment) interface as defined in [6] specifies the "commands" and data that can be sent to/from the SIM/ME. For instance, to run the GSM A3/A8 AKA algorithms, there is a "RUN_GSM_ALGORITHMS" command that routes input parameters/output results to/from the resident AKA algorithms. The AKA algorithms compute a response and/or one or more keys from a random challenge RAND and the stored subscriber key, k, or corresponding security key. In the list of commands possible over the SIM-ME interface, we specially note the "ENVELOPE" command, which is intended to send more or less arbitrary data to the SIM for use with the SIM Application Toolkit (SAT). The input/output format to the SIM is explicitly specified, but there is a high degree of freedom exactly what the applications can do or not. For instance, the application could be a quite general Java Applet, see [7]. The applet can be given various degrees of authorization to access resident GSM-related files, one possibility being to give it "full GSM access".

In a preferred embodiment of the invention, the DRM agent is implemented in the application environment provided by the SIM Application Toolkit (SAT) or a corresponding toolkit for another type of identity module, using the "ENVELOPE" command or an analogous command. Input data to the application is then preferably also transferred into the SAT by means of the ENVELOPE command. The SIM Application Toolkit (SAT) thus enables the operator to "hardcode", or download, over the air in the case of a mobile, a DRM agent application into the SIM. In the latter download case, it is also possible (and strongly recommended) to authenticate the DRM download application as coming from the right operator. This is important since it gives protection against downloading "viruses" from malicious servers. The downloaded DRM application can also be encrypted so that the application content is not available outside the SIM. For security aspects related to GSM SAT, reference is made to [8]. For communication between the DRM agent and the AKA module, there is preferably, but not necessarily, a direct interface between the AKA module 122 and the SAT application environment 124. Execution of the DRM application in the SAT environment is naturally supported by the processing resources of the SIM. For more information on fundamental details of the GSM SIM specification, reference is made to [9].

It should be understood that the application environment 124 may optionally be arranged with its own specific AKA module, operating based on x and/or k.

Preferably, this AKA module is integrated in the DRM agent application, as schematically indicated in FIG. 2B.

By implementing the DRM agent of the tamper-resistant identity module in the application environment, it is also possible to upgrade the functionality of the DRM agent. Upgrades are simply downloaded using download commands associated with the client and implemented, e.g. using the ENVELOPE command, into the application environment of the client. This is an advantageous solution if the DRM agent is broken or "hacked", so that its code and/or secret keys become publicly available, e.g. on the Internet. Then, instead of changing all client devices, the associated DRM agent is simply updated by downloading and implementing new algorithms and or keys.

For encryption and authentication in the DRM system, any standard cryptographic techniques may be used, including both symmetric and asymmetric encryption and authentication. Using symmetric encryption and/or authentication, the encryption key is a shared symmetric key, a copy of which is stored both in the identity module and at the network operator or content provider. Alternatively, an asymmetric key pair may be used for encryption and authentication based on a Public Key Infrastructure (PKI). For asymmetric encryption, the public key is used for encryption and the corresponding private key for depcryption. For asymmetric authentication, the private key is used for signing and the corresponding public key for verification. Also, subscription-associated usernames and passwords may be used in the context of authentication. If the client has one or several network addresses, e.g. IP addresses, associated thereto, such address(es) can also be used for authentication, at least to some extent.

In the following, however, encryption and authentication will mainly be described in the context of symmetric cryptography, using the subscriber key k and/or a DRM specific key x of the identity module. The DRM specific key x, may be located anywhere in the identity module, preferably in the application environment, and even integrated in the DRM agent.

Figure 3:
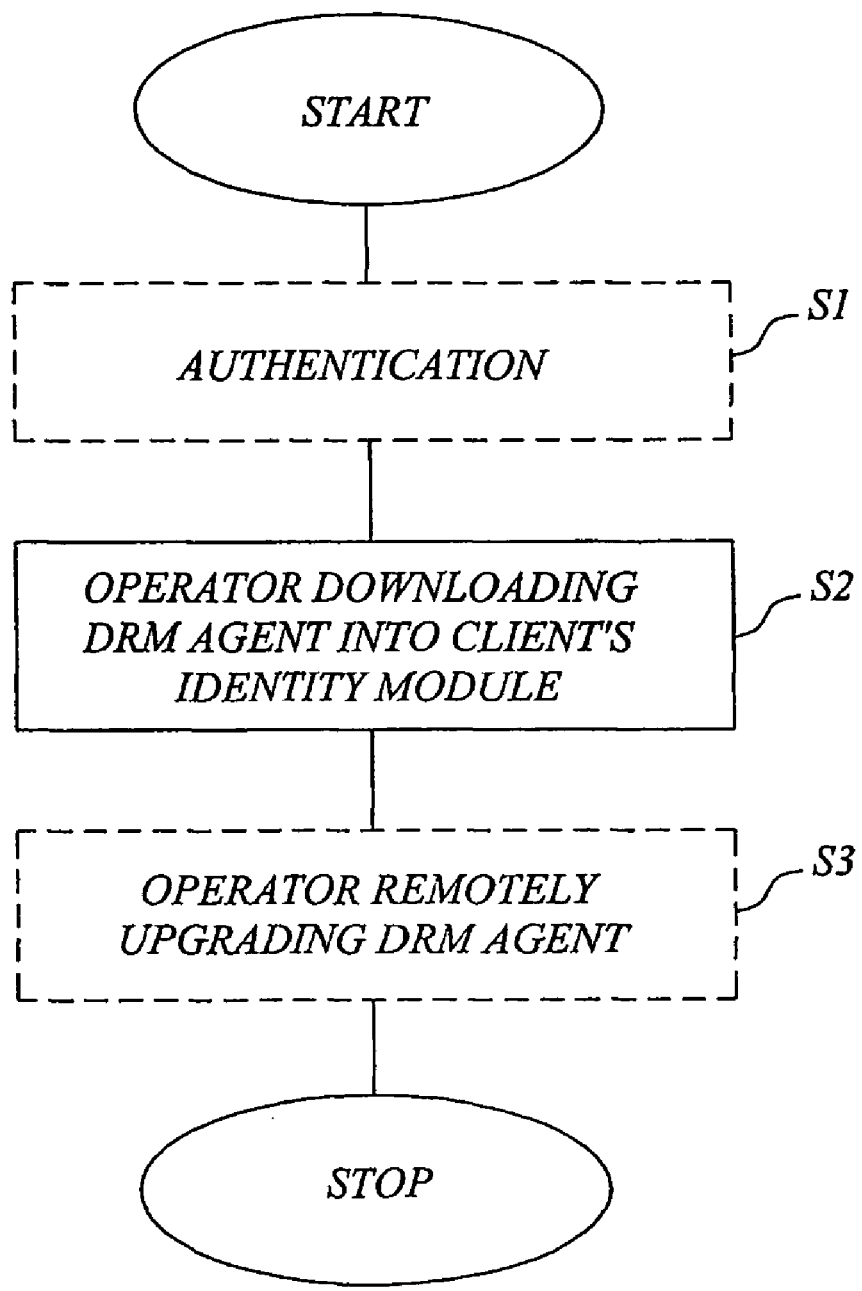
FIG. 3 is a flow diagram illustrating a digital rights management method according to a preferred embodiment of the invention.

FIG. 3 is a flow diagram illustrating a digital rights management method according to a preferred embodiment of the invention. The method is directed towards the network operator side of the overall DRM system, and concerns the downloading, or more generally loading, of a DRM agent into a tamper-resistant identity module arranged in relation to a client system. As a recommended, but optional first step (S1) mutual authentication is performed between client and operator or corresponding party. The operator may optionally generate authentication data for transmission to the identity module of the client to enable the client to authenticate that the DRM agent comes from a trusted operator. The operator performs a download (S2), optionally authenticated, of a DRM agent into the identity module, for example as an SAT application into an SIM using the "ENVELOPE" command. If required, for example due to a security flaw, the DRM agent may be remotely upgraded (S3) by the network operator, which downloads the required patches or entirely new DRM algorithms. The operator or content provider may also authenticate that requesting clients have identity modules with compliant DRM agents, using any known authentication technique. This authentication of the DRM agent normally includes verification that the DRM agent is of a compliant type, but preferably also includes DRM agent version verification.

Figure 4:
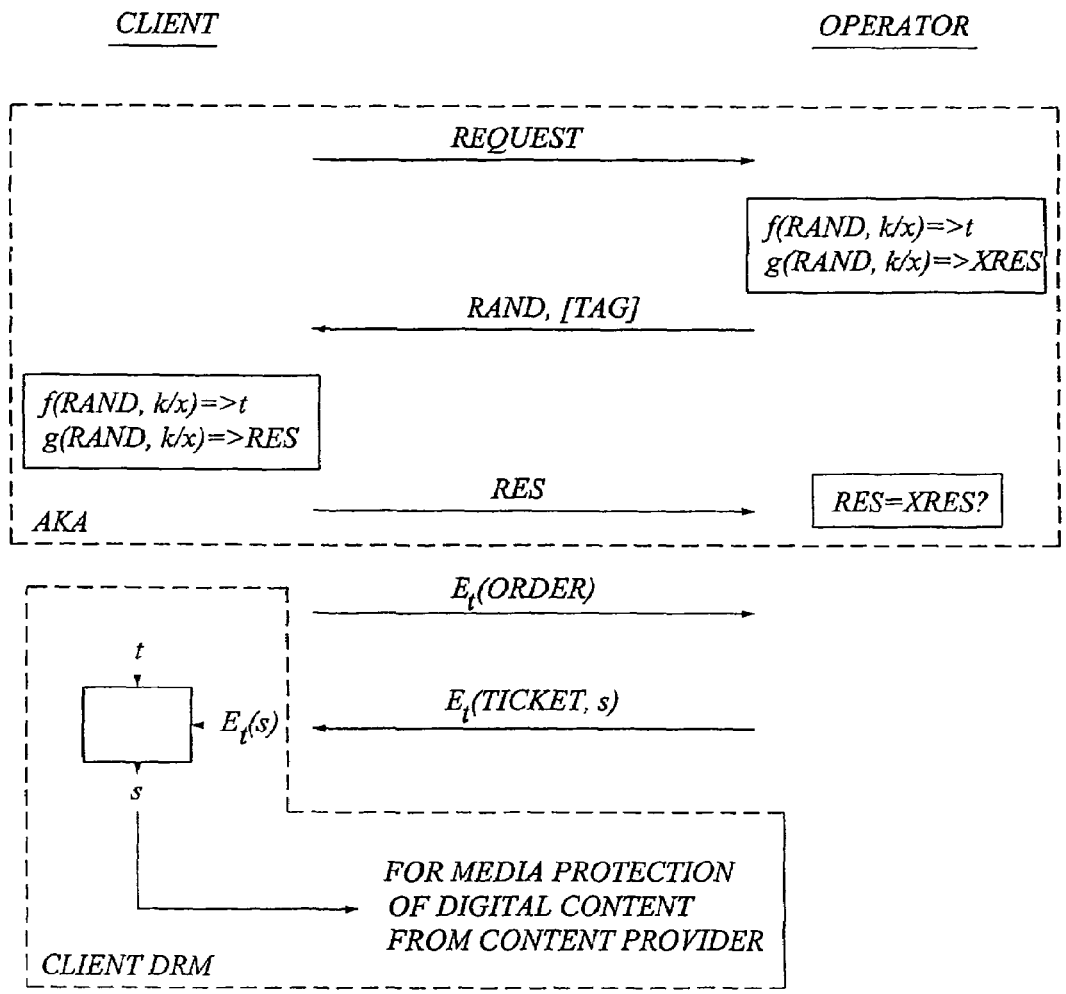
FIG. 4 is a schematic diagram illustrating an example of client-operator authentication and key agreement, client-side digital rights management, as well as the associated client-operator communication.

FIG. 4 is a schematic diagram illustrating an example of client-operator authentication and key agreement, client-side digital rights management, as well as the associated client-operator communication. In this particular example, the client sends a request for authentication (or DRM activation), together with an identification tag, to the operator. The operator performs authentication and key agreement (AKA) using a random challenge, RAND, other optional user data, the key k and/or a special DRM key x as input to cryptographic functions f and g, thus generating a session key t to be used for secure communication between the client and the operator and an expected response, XRES, respectively. The operator sends the random challenge, RAND, possibly together with an authentication tag, to the identity module of the client. The data is received by the client's identity module and, if an authentication tag is present, the identity module first authenticates the received data using k/x and then runs the same AKA functions f and g with the same input to derive the session key t and a response, RES. The response, RES, is sent back to the operator and compared to the previously calculated expected response, XRES, so that it can be verified that the operator is in contact with the right application. In the following, $E_z(m)$ represents a message m, protected by a key z. "E" is intended to denote "encryption", but it may (and often should) also encompass authentication, integrity and, for certain types of digital content, perhaps even replay protection. Next, the client places an order, protected by the session key t, to the operator. The operator, which in this particular example acts as an order server, generates a ticket and a further session key s, also referred to as a media or content protection key, and encrypts the ticket and the key s with the previously generated session key t. The encrypted ticket and media protection key s is sent to the client, which invokes the DRM agent in order to decrypt the ticket and the media protection key s by using the key t. The media protection key s and the associated ticket are also securely forwarded to the content provider, which then encrypts the ordered digital content by using the media protection key s and sends the protected media to the client. Once received by the client, the protected media content is decrypted, either by the DRM agent or more likely by some DRM functionality present in the rendering device, using the media protection key s.

The identity module is preferably the base for a charging mechanism that can be used also for payment of digital content in the DRM system. In the simplest form, charging for digital content usage is subscription-based, and the AKA procedure in the identity module ensures that the correct user/subscriber will be charged and billed for the content. The same applies to a pre-paid subscription where it is required to make sure that the correct pre-paid account will be accessed for charging. In a more advanced solution, credit cards or some form of micropayments may be used, where information, such as a session key, from the AKA procedure can be used to protect transfer of charging data such as credit card number or payment "ticks", possibly together with integrity protected information concerning the usage of the content.

It is for example possible to configure the DRM agent in the identity module, especially when it is closely associated to the rendering device, in such a way that it compiles information related to the actual digital-content usage process, such as information concerning what content that was used, the quality of the used content, what amount of data and for how long or how many times the content was used. This information may then serve as a basis for charging for digital-content usage. The compiled information may then be integrity protected based on an identity-module specific key k/x and transferred to the network operator or to a dedicated billing institute managing the actual charging of digital content.

As previously indicated, the DRM agent implemented in the identity module typically includes functionality for cryptographic processing of DRM metadata associated with the digital content to be rendered. This metadata may for example be one or several keys as well as encrypted information. Normally, the DRM agent includes some basic functionality for more or less directly generating or extracting a decryption key to be used for decrypting the encrypted digital content, as described below with reference to FIG. 5.

Figure 5:
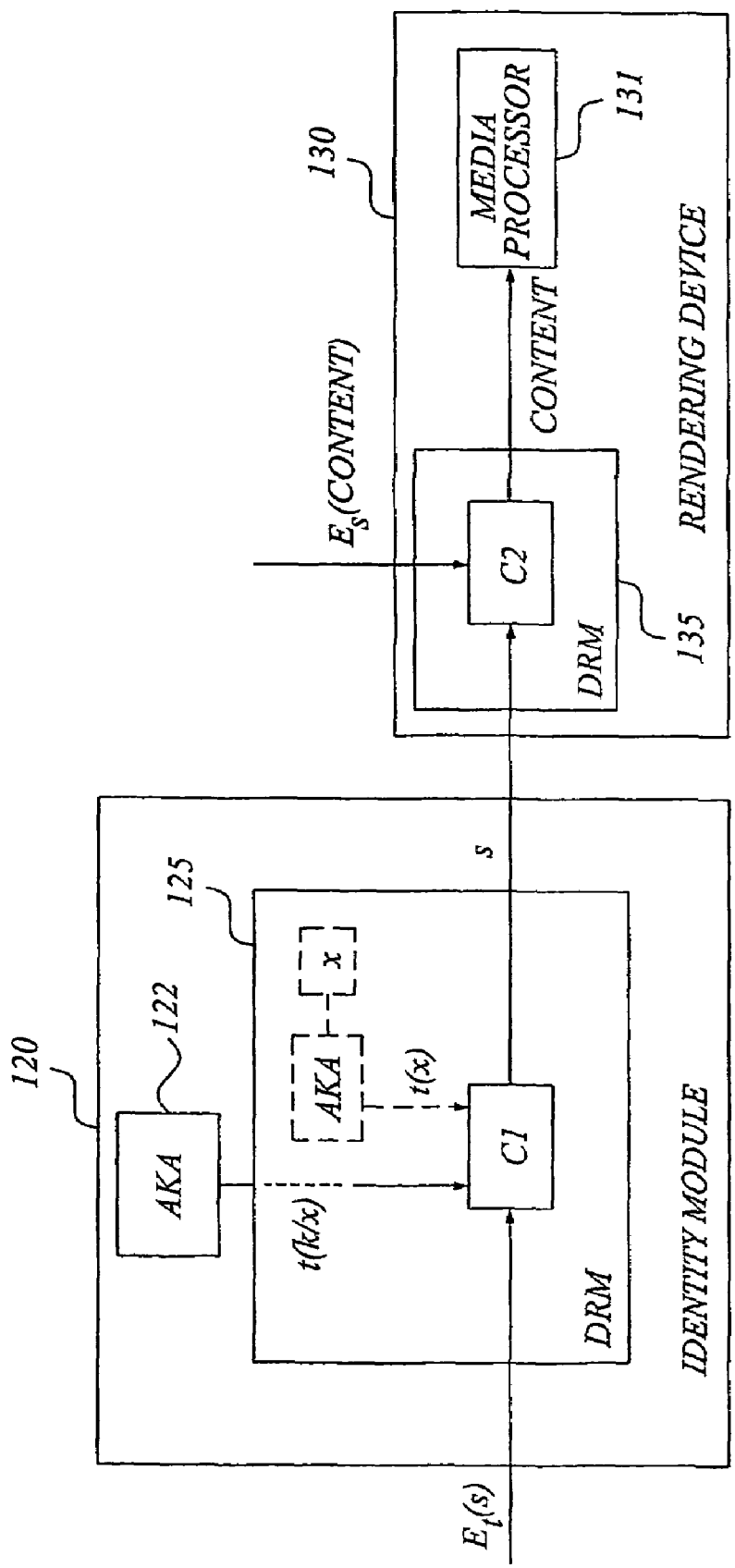
FIG. 5 illustrates a realization of the invention with DRM functionality distributed between a tamper-resistant identity module and an associated rendering device according to an embodiment of the invention.

In FIG. 5, the identity module and the rendering device are shown as separate units. These units can be co-located in the same client device, such as a mobile telephone, PC, radio receiving unit, or alternatively, the rendering device can be provided as an external stand-alone client device whereby the separate client devices are interconnected directly or indirectly. The block diagram of FIG. 5 only illustrates those components that are relevant to the invention. The identity module 120 has an AKA module 122, and a DRM agent 125. Among other things, the AKA module 122 generates the session key t, preferably based on the subscriber key, k, and/or a special DRM key, x. The DRM agent 125 comprises a cryptographic unit C1 for extracting the media protection key (also referred to as a session key) s based on the session key t received from the AKA module 122 and the encrypted information $E_t(s)$ received from the network operator. In this embodiment, the rendering device 130 includes a media processor 131 and a DRM agent 135. The DRM agent 135 in the rendering device 130 includes a cryptographic unit C2 for decrypting the protected media content from the content provider by using the media protection key extracted by the DRM agent 125 in the identity module. The decrypted media content is finally sent to the media processor 131 in the rendering device 130 for preparing the actual rendering.

It should be noted that the protection of the content protection key s, for example as shown in FIG. 5, is preferably applied at the application level, thus facilitating functionality upgrades. In a typical communication system (e.g. GSM, UMTS), the content protection key s will also be protected at a lower (link) layer by the (air) interface protection. This latter protection is naturally also based on key-agreement procedures, typically using only the network subscription key k. In other words, the content protection key will typically be "double" protected, at the link layer by a key t'(k) and at the application level by the key t(k/x). If one has enough confidence in the link layer protection and the tamper-resistance of the client system, further protection by t at the application level may be omitted.

Throughout the following examples, it should be understood that when application level protection is applied, there may optionally/alternatively be a DRM-internal AKA module (indicated by dashed lines), preferably operating based on a DRM-specific key x.

For a distributed DRM module, with a first DRM agent in the identity module and a second DRM agent in the usage device, it might be advisable, especially when the usage device is a stand-alone device, to tamper-resistantly configure the identity module and the usage device with usage-device specific key information for allowing communication between the two DRM agents based on this device key information.

The device key information may be a shared secret key, or an asymmetric key pair, allowing authentication and/or protection of information communicated between the DRM agents. The device key is normally tamper-resistantly stored in the rendering device, and the infrastructure of the network operator and/or a trusted certification party can be used for securely transferring corresponding device key information for storage in the tamper-resistant identity module, as will be described later with reference to FIG. 9.

Figure 6:
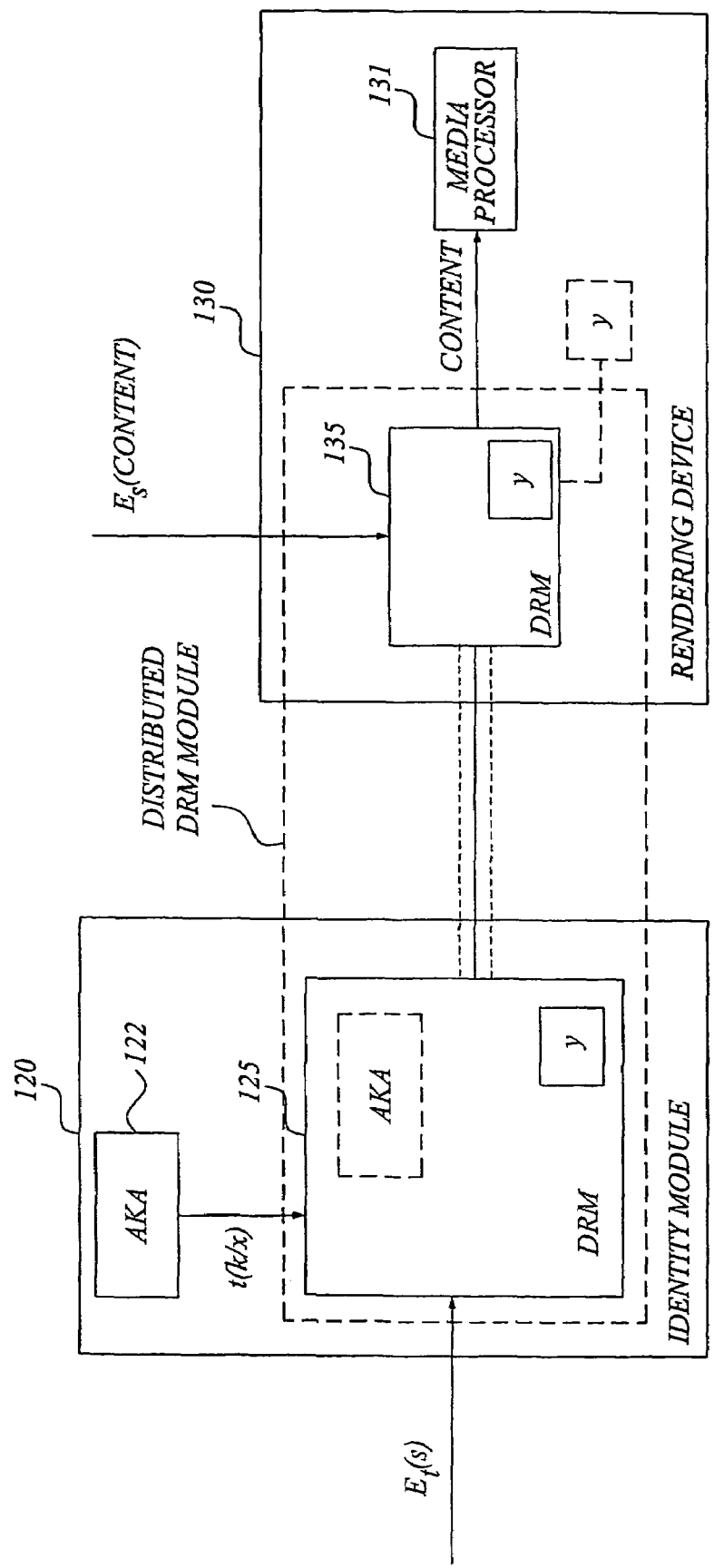
FIG. 6 illustrates an example of a distributed DRM module with communication between the distributed DRM agents based on a usage-device specific key according to a preferred embodiment of the invention.

FIG. 6 illustrates an example of a distributed DRM module with communication between the distributed DRM agents based on a usage-device specific key according to a preferred embodiment of the invention. In similarity to the basic structure of FIG. 5, the identity module 120 comprises an AKA module 122 and a first DRM agent 125, and the usage device, here illustrated as a rendering device 130, comprises a media processor 131 and a second DRM agent 135. The DRM agents 125, 135 may be implemented in hardware, software or a combination thereof.

In the particular example of FIG. 6, which relates to symmetric authentication and/or encryption, both the identity module 120 and the rendering device 130 are configured with a shared secret rendering-device (or more generally usage-device) specific key, y. In an exemplary embodiment, the shared device key y is implemented in the DRM agents 125, 135 of the involved entities. This is a perfectly valid solution, for example when the DRM agent 135 of the rendering device is implemented as a hardware circuit. However, it may be beneficial to tamper-resistantly implement the device key, y, outside of the DRM agent in the rendering device, especially when the rendering device DRM agent is a software-based application. In this case, the device key y is preferably stored in the rendering device within a special tamper-resistant environment, such as a dedicated security circuit (as indicated by the dashed box containing "y" in FIG. 6).

Figure 7A:
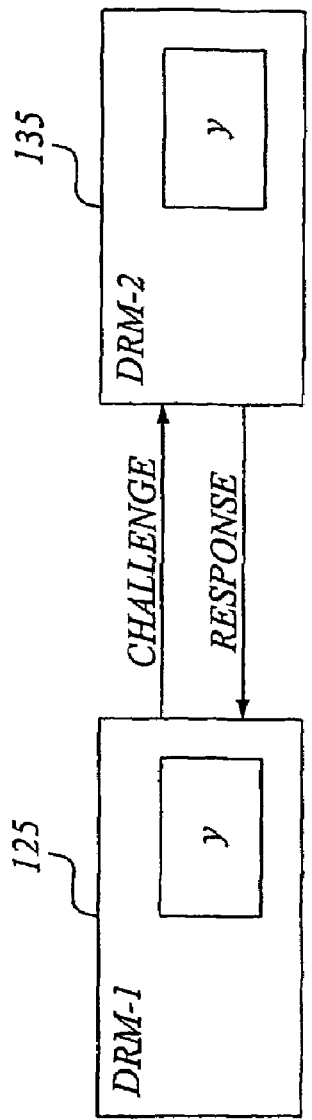
FIG. 7A illustrates a challenge-response authentication procedure between the DRM agents in the DRM module of FIG. 6.
Figure 7B:
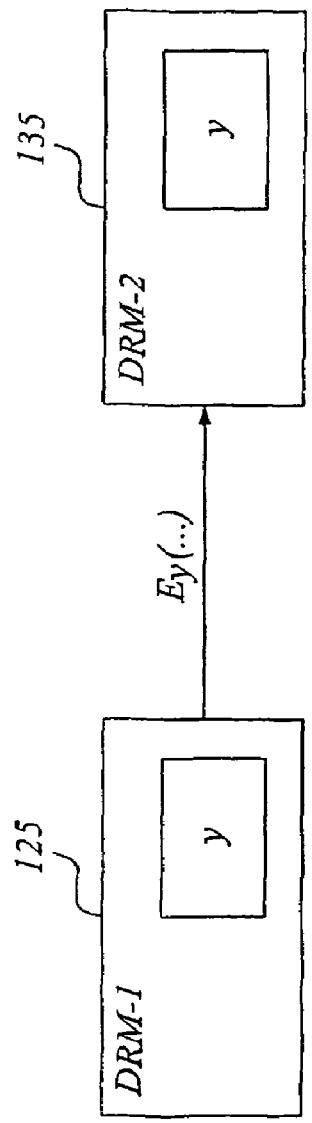
FIG. 7B illustrates encrypted communication between the distributed DRM agents in the DRM module of FIG. 6.

The communication channel between the two DRM agents is preferably authenticated and/or protected based on the device key, y, or possibly a device key representation. In the case of authenticated communication, as illustrated in FIG. 7A, the DRM agent in the identity module can authenticate that it is in contact with a usage device having a valid, tamper-resistant DRM agent. More particularly, the first DRM agent 125 authenticates the usage device to verify that it includes a valid DRM agent 135, for example one that properly enforces the usage rules associated with the content. Preferably, an explicit authentication is performed using a challenge-response procedure based on the device key, y. The communication between the distributed DRM agents may alternatively, or as a complement, be encrypted or otherwise protected, as illustrated in FIG. 7B. The DRM agent 125 in the identity module 120 could then rely on implicit authentication, i.e. only a rendering device 130 implementing the key, y, can decrypt DRM data encrypted by the device key, y. Although the device-key based communication is especially useful when the rendering device is a "stand-alone" device, it should be understood that device-key communication is also applicable for a client device, such as a mobile phone, having its own integrated rendering application, thus pairing the identity module to the mobile phone itself.

The device-key based communication between the tamper-resistant identity module and the rendering device may be used for transferring DRM data, such as content-protection keys, information concerning the content-usage process, and even DRM applications/upgrades between the two entities, as will be exemplified below.

If the rendering device is a stand-alone device, it is recommended that it has its own DRM rule-enforcement and that the usage rules are sent in the ticket along with the media, or forwarded from the identity module's DRM agent, so that the rendering device can act as an agent on behalf of the content owner/provider and assert that the usage rules are followed.

Figure 8:
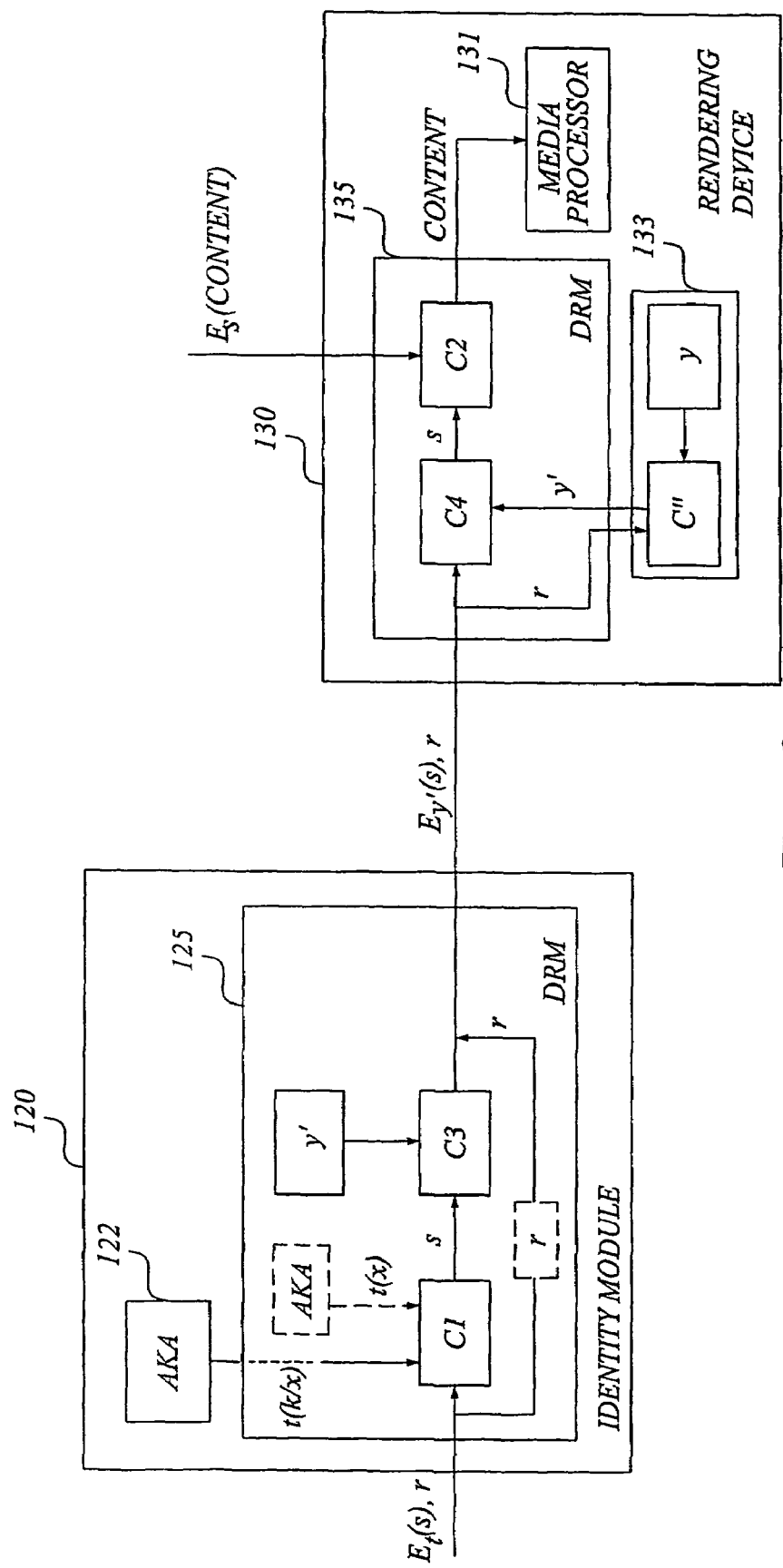
FIG. 8 illustrates a preferred implementation of a distributed DRM module with device-key based communication between a DRM agent in a tamper-resistant identity module and a DRM agent in a rendering device.

FIG. 8 illustrates a preferred implementation of a distributed DRM module with device-key based communication between a DRM agent in a tamper-resistant identity module and a DRM agent in a rendering device. More specifically, the implementation of FIG. 8 illustrates how a media or content protection key s can be sent encrypted between the DRM agent of the identity module and the DRM agent of the rendering device, with a higher level of security for the actual device key. Although it is possible to implement the identity module with an instance of the device key y, and encrypt the content protection key s directly by the device key y itself, it is normally recommendable to determine another key y' derived from the original device key y and securely transfer the determined key y' to the identity module for use in providing secure/authenticated communication between the distributed DRM agents. In this way, there is no need to store the actual device key y in the identity module.

With reference to FIG. 8, the DRM agent 125 in the identity module 120 comprises two logically separated cryptographic units C1 and C3. The cryptographic unit C1 is similar to that of FIG. 5, and the cryptographic unit C3 is configured to encrypt the protection key s by means of the key y', before transmittal to the rendering device 130. It is here assumed that the device key representation y' has been implemented in the identity module, and more particularly in the DRM agent 125. The key y' may for example be derived by a trusted certification party, using the secret device key y (or a representation thereof) and a challenge r as input to a cryptographic function C', and then securely transferred for storage in the identity module, as will be explained in more detail later on.

In order to be able to perform "device-key" based communication between the two DRM agents, the rendering device must be capable of determining the device key information y'. To this end, the rendering device 130 is preferably equipped with a tamper-resistant security circuit 133, which includes both the device key y and a cryptographic function C" (corresponding to the function C'), which in response to the challenge r and the internal device key y determines y'. In this way, the device key y never have to leave the controlled environment of the tamper-resistant security circuit, and a high level of device key security is maintained even with a software-based DRM agent in the rendering device.

The challenge, r, is preferably transferred from the trusted certification party to the identity module, perhaps at the time when y' is transferred to and implemented in the identity module, or later, e.g. when the encrypted content and/or a corresponding ticket is transferred to the identity module. The challenge r may optionally be stored in the identity module. Subsequently, the challenge r is transmitted, possibly along with the encrypted content protection key, s, to the second DRM agent 135 in the rendering device 130. The DRM agent 135 in the rendering device 130 invokes the security circuit 133 by forwarding the challenge r, and the security circuit responds by forwarding the device key representation y' to the DRM agent 135. The DRM agent 135 in the rendering device 130 also includes a cryptographic unit C4 for decrypting the encrypted key s by using the generated key y', and a cryptographic unit C2 for decrypting the encrypted media content by using the decrypted key s. The digital content is finally sent to the media processor 131 for rendering. The key y' can be regarded as a session key that is unique for each communication session between the DRM agent in the identity module and the DRM agent in the rendering device. Of course, an explicit challenge-response authentication protocol based on the device key, y, or the device key representation y' can also be implemented in the distributed DRM module of FIG. 8.

Figure 9:
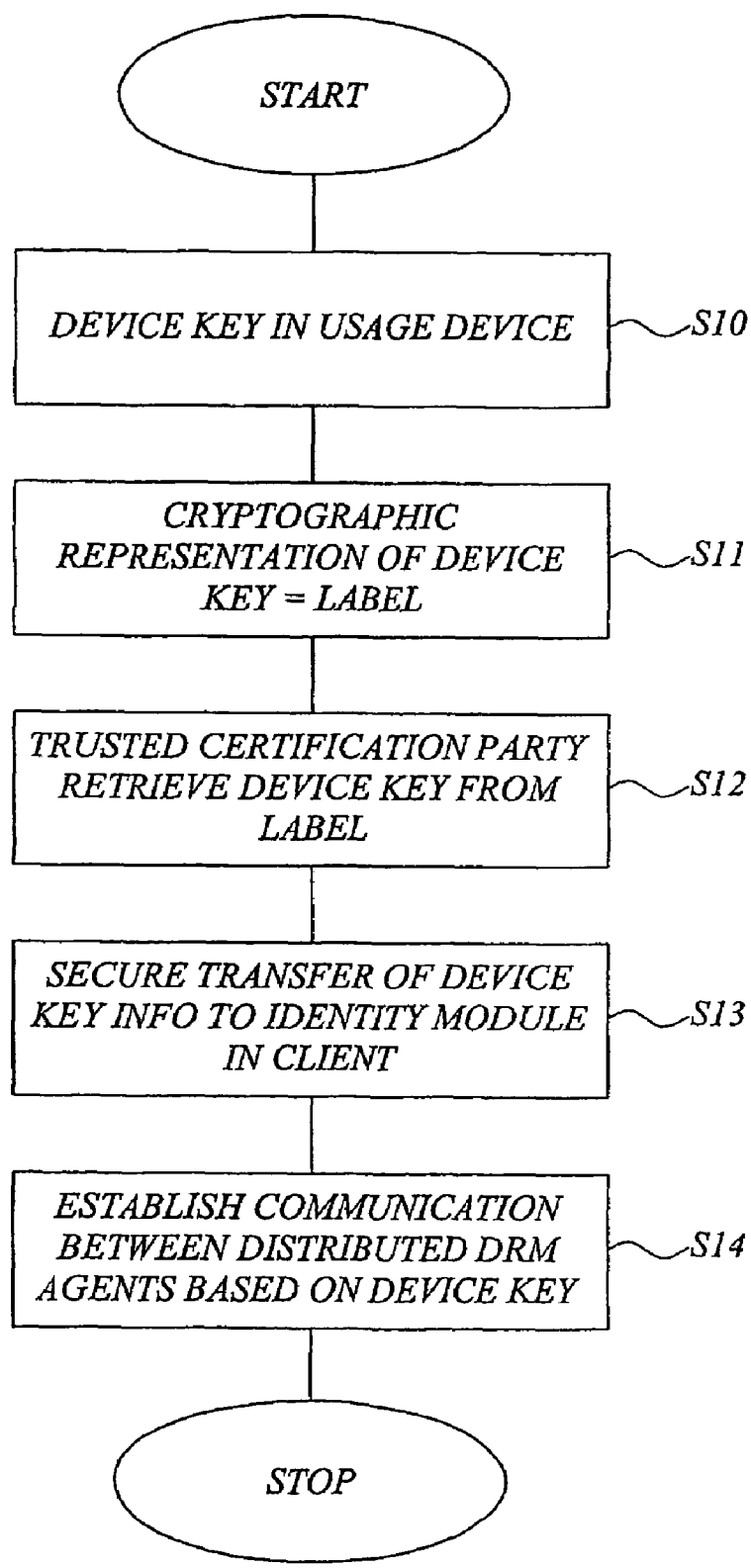
FIG. 9 is a schematic flow diagram of a digital rights management method for establishing device-key based communication between distributed DRM agents.

FIG. 9 is a schematic flow diagram of a digital rights management method for establishing device-key based communication between distributed DRM agents. The rendering device is tamper-resistantly configured with a usage-device specific key y (S10).

As the device key y is specific to the rendering device, the client (the identity module) may establish a trust relation with that device, in particular the very first time when the rendering device is brand new. Note that it is not secure to simply write "y" on the outside of the rendering device, as it could be copied and a cloned, non-secure device could easily be created. Instead, identification information, such as the result of applying some cryptographic function h to the key y may be attached to a "label" on the rendering device when it is sold, or transferred from the rendering device to the associated client device when interconnected, thus making a cryptographic representation of the device key available to a user/the client device (S11). The cryptographic representation of the device key may, for example, involve a one-way cryptographic function, symmetric or asymmetric encryption. The device is associated with a random, secret device key y, and when the buyer wishes to activate the device, he sends the (open) cryptographic representation h(y), or similar identification information, to the operator (or another trusted certification party) who checks that h(y) is assigned to a valid device, retrieves the device key (S12) or suitable key information, such as y', derived from the device key, and finally updates (S13) the DRM application in the identity module with the device key y or key information derived therefrom.

It is assumed that the operator or another trusted certification party (in some business models, the trusted party may be the device manufacturer) has some key that enables him to invert the function h or otherwise is capable of retrieving suitable device key information, e.g. by using look-up tables (S12). For example, it may be the case that the device key itself should never be available outside of the rendering device, not even explicitly known by the certification party. In this case, the certification party is capable of retrieving key information, such as y', that is based on the actual device key y and perhaps additional input data.

It is also assumed that the device key information is securely transferred from the certification party to the identity module in the client device based on some identity-module specific key (S13). Once properly configured in the DRM agent of the identity module, the device key information, i.e. the device key or some other key derived from the device key, may be used for establishing communication (secure and/or authenticated) with the DRM agent in the rendering device (S14). Apparently, if a key derived from the actual device key y is transferred to and implemented in the identity module, the rendering device has to implement some function that based on the device key generates the same key derivative as in the identity module.

The value y can be checked by the certification party to verify that only "authentic" (i.e. not stolen, hacked or otherwise compromised) rendering devices, ones with "valid"

y-values, are used in the system. If a user purchases a new rendering device, he can add support (a new key in his identity module) for the device in a simple way. This can be used for registration; in the identity module (as well as in a third registration party), of various rendering devices with which the client (identity module) wants to establish trust relations.

In DRM, there is often a requirement of "fair use", i.e. if a user buys content, he or she should be allowed to use it on any (DRM compliant) device successfully registered in his "home domain" (e.g. a family domain). However, there is a risk that different users across the world form a "global virtual domain" so that content can be shared more or less globally anyway. The present invention can limit the risk of such global spreading of content. Since the device registration is based on an identity module, tied to a user or subscription, it is possible for the trusted party (e.g. the operator) that manages registration requests to verify that a new device is allowed in a certain domain. For instance, if three family members have subscriptions with the same operator (or different operators under contractual agreement), the operator can verify that if a device has already been registered, it was by a user belonging to the same domain. Following a successful registration, the operator authorizes the device to be registered in the new identity module, e.g. by sending device specific keys or other information.

It should be understood that the response of sending the "labeled" identification key to the certification party may be any a device key representation allowing the DRM agent to communicate with the DRM agent of the rendering device.

The actual key information used for communication between the distributed DRM agents may be the same independent of what identity module that is used. Alternatively, however, the key information used for authenticated and/or secure communication is made dependent on the usage device key as well as on the particular identity module that is currently associated with the rendering device. In this way, different client terminals (each having its own identity module) associated with the same rendering device may have unique device key information.

This actually represents a special case of sending a key derived from the device key y, rather than sending the device key itself, from the trusted certification party to the identity module. As before, the cryptographic representation h(y) of the device key y is sent to the operator (or another trusted certification party) who checks that h(y) is assigned to a valid device. The operator then, for example, generates a value b that depends on an identity-module specific key, such as k and/or x, and finally generates a device key representation y" based on the generated value b and the device key y:

b=function (k/x), y"=function (b, y).

Preferably, the values b and y" are securely transferred from the operator to the identity module. The device key representation y" (and possibly also b) is securely stored in the identity module, and the value b is transferred to the rendering device (possibly together with an identity module identification). The rendering device, which is configured with an instance of the same function for generating the device key representation y" as the operator, calculates y" based on b and the internal device key y. The key device representation y" may then be used for communication between the identity module and the rendering device, in analogy with the embodiment of FIG. 8.

If a strict dependence on k/x is not desired, the value b could simply be a random number or other value generated or assigned by the operator, or corresponding party.

It should also be understood that the device key in the rendering device could alternatively be a private key, with the identity module holding a copy of the corresponding public key.

As previously described, the DRM agent in the identity module may be configured to compile information about the digital-content usage process that can be used as a basis for charging. However, for a distributed DRM module with a first DRM agent in the identity module and a second separate DRM agent in the actual rendering device, this usage information is typically compiled by the DRM agent of the rendering device. The second DRM agent compiles the information as the rendering device consumes the digital content, and sends the information to the first DRM agent, preferably using the authenticated and/or secure device-key based communication. For example, it is beneficial to use the device key to integrity protect the compiled information. The first DRM agent authenticates and/or decrypts the compiled information based on corresponding device key information and stores the information in a log and/or sends the information to an external trusted party for logging. Preferably, the first DRM agent integrity protects and/or encrypts the log information before transferring it to the external trusted party, using symmetric or asymmetric cryptography. This logging information can then be used, e.g. for non-repudiation purposes.

In a more elaborate communication protocol, the first DRM agent and the second DRM agent exchange control signals for controlling the rendering process, or more generally the usage process. For example, the second DRM agent in the rendering device intermittently generates an acknowledgement ACK signal indicating that the process of using received digital content proceeds without disturbances. The ACK signal is preferably accompanied by log information, e.g. related to the amount of rendering time, amount of successfully rendered data, rendering quality, time delays, buffer overflows, and other data concerning the rendering process. The first DRM agent includes functionality for processing this signal information and for sending a so-called forward proceed signal FPS to the second DRM agent in response thereto. The FPS signal is required in order for the rendering process to continue, whereas a missing FPS signal causes the rendering process to stop or to proceed according to predetermined limitations, e.g. limited Quality of Service (QoS). The FPS signal may include information, such as a Device Access Code (DAC) extracted from the corresponding ticket by the first DRM agent or information obtained by analyzing the log data received from the second DRM agent, that can be used for controlling the rendering process. The second DRM agent is thus configured for receiving the FPS signal and for controlling the rendering process in dependence on data associated with the FPS signal. This type of communication protocol may be particularly useful in so-called broadcast applications, where the logging information from the second DRM agent serves as a basis for charging. If the first DRM agent does not receive such logging information, the first DRM agent is capable of controlling the continued rendering process by means of the FPS signal.

The first DRM agent may also be capable of extracting the usage rules associated with the digital content from the ticket and forward these rules to the rendering device for enforcement by the second DRM agent. Alternatively, however, the usage rules are sent directly, preferably together with the encrypted digital content, to the rendering device and the DRM agent therein.

This communication protocol preferably utilizes the device-key based communication described above, in which authentication and/or encryption based on usage-device specific key information is performed.

In similarity to a DRM agent implemented as an application in an application environment within the identity module, the DRM agent in the rendering device may also be implemented as a software application, preferably in a tamper-resistant application environment in the rendering device. This means that a DRM application adapted for use in a rendering device may be downloaded into the rendering device application environment either via a network operator and the associated identity module (with its DRM agent), or more or less directly from a content provider or corresponding party, based on usage-device specific key information.

It should be noted that "download" of DRM agents is possible also when a device does not have its own means for outbound communication. Consider for instance a TV receiver and a set-top box. To upgrade the TV and/or set-top box with new DRM functionality, one can proceed as follows. Using a separate communication device, e.g. a telephone, the user orders a DRM agent. If needed, device specific data is entered that enables the operator to configure the DRM agent to the device, e.g. encrypting it with device specific keys. The DRM agent is then transported to the device by allocating bandwidth on the broadcast channel. For instance, in the case of a TV receiver, the DRM agent could be transported by encoding it into the Text-TV information channel. For radio, the RDS information channel might be used. If the DRM agent is encrypted with device specific keys, it does not matter that the broadcast medium is easily intercepted.

To ensure proper authentication of the DRM agent in the rendering device when a DRM agent or a new upgraded version of such a DRM agent is downloaded, the original (current) device key information should preferably be replaced by new device key information that is associated with the downloaded DRM agent. This typically implies that the device key information is stored in a rewriteable memory, for example in a tamper-resistant security circuit provided with a rewriteable memory, in a tamper-resistant rendering device application environment or a memory accessible from such an application environment.

Preferably, the DRM agent and a re-initialization value associated therewith are securely (encrypted and/or authenticated) downloaded into the rendering device application environment based on the original (current) device key. The original device key, here denoted $y_1$, together with the re-initialization value re-init, preferably authenticated based on the original device key, are used as input to a cryptographic function, f', to generate a new device key, denoted $y_2$, which then replaces the original device key $y_1$ in the rewriteable memory:

$$y_2 = f'(y_1, \text{re-init}).$$

For example, the re-initialization value re-init may be generated by a network operator, a content provider or trusted certification party, which party uses the same function f' and the same input $y_1$ and re-init to generate the new device key $y_2$. If the DRM agent and the re-initialization value re-init are transferred to the rendering device via a network operator and the associated identity module, and the DRM agent in the identity module is configured with a copy of the function f' and the original device key $y_1$, the new device key $y_2$ may be generated directly in the identity module, replacing the original device key information. Alternatively, as previously described for the original device key, the new device key or a representation thereof may be securely transferred from the certification party to the identity module based on an identity-module specific key, such as a subscription key k.

The new device key information can then be used, for example for communication between distributed DRM agents in the client system, or when later downloading an even newer DRM agent into the rendering device application environment.

In general, there may be other circumstances that call for replacement of the device key, for example if the device key y is compromised. The device manufacturer or some other trusted party may have access to a Device Access Code (DAC), which when applied to the device enables (authenticated) replacement of the device key. It should though be understood that replacement of the device key in the rendering device does not generally form part of the normal everyday routines for digital rights management, and that device key replacement typically also implies administrative procedures such as updating device key/identification databases.

If the rendering device is to be transferred to another user having its own client terminal such as a mobile or PC, the previously described "registration procedure" for transferring corresponding device key information into the identity module in the new client terminal is normally performed. As mentioned, it is usually better to register key information derived from the device key rather than the device key itself so that the device key, y, will not be present in each and every client terminal used with the rendering device. Anyway, it may be advantageous to revoke or otherwise invalidate the device key information in user terminals that no longer should be used with that rendering device. There are several different ways of dealing with this problem. For example, the device key, y, in the rendering device may be upgraded, so that "old" terminals cannot be used with the device anymore. This could be done by an authorized service point, or remotely over a network. Alternatively, the device key information in the identity module may deleted by a trusted party such as a network operator, for example through the use of an identity-module specific access code allowing deletion of the device key and/or by authenticating that the "delete" command comes from the trusted party.

On the other hand, as previously mentioned, there could also be cases when it is actually desired that the same device can be used by two (or more) different user terminals/identity modules.

It is also recognized that the use of "keys" inside devices could be used for anti-theft purposes: without knowing the key, the device is useless, and if someone tries to configure a device, it could be checked against a register of stolen devices.

In a more open application environment, the tamper-resistance of the rendering device and its DRM functionality may be provided based on the concept of security-by-obscurity, writing the software code and associated keys in a complicated, obscure manner in order to make it extremely difficult for an external party to understand the code and even more difficult to distinguish security keys from the remaining code.

Figure 10:
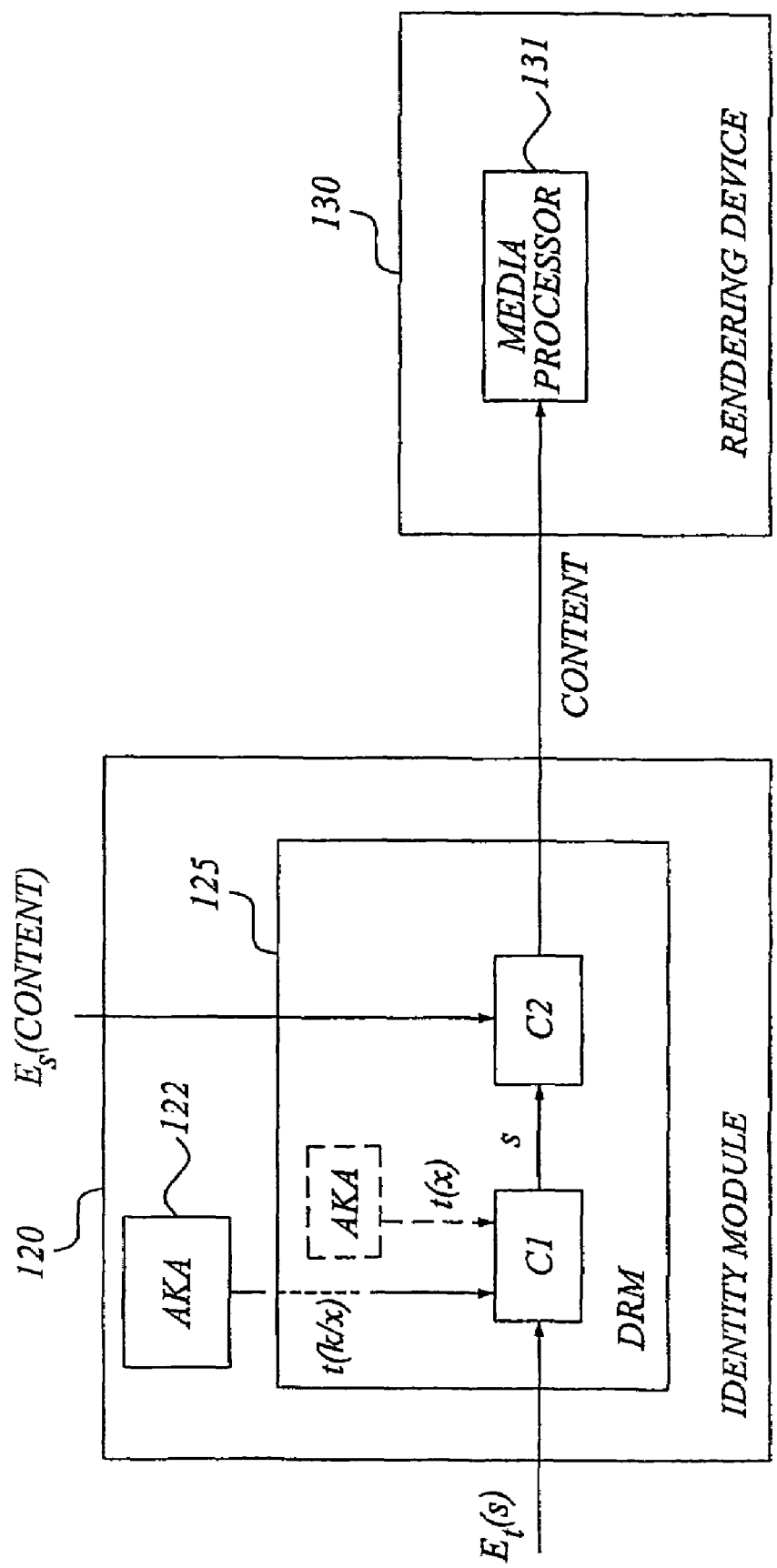
FIG. 10 illustrates a tamper-resistant identity module and an associated rendering device according to another embodiment of the invention.

In addition to the security aspects discussed above, it is normally required to perform the actual decryption of the digital content in the DRM agent of the rendering device because of the limited processing capacity of standard identity modules of today. However, with increased processing capacity in the identity modules, for example in future generation identity modules such-as future UICC cards, it may be feasible to integrate the decryption of the content into the identity module's DRM agent, as illustrated in FIG. 10. This realization, however, typically relates to the case of a client device, such as a mobile unit, having its own integrated rendering application, with somewhat more relaxed security requirements with regard to digital rights management. In the example of FIG. 10, the identity module 120 comprises both a cryptographic unit C1 for generating the media protection key s, and a cryptographic unit C2 for decrypting the encrypted media content using the protection key s from the cryptographic unit C1. The decrypted media content is then sent to the rendering device 130 for processing and rendering. If rule enforcement is required, such rule enforcement functionality may also be implemented in the DRM agent of the identity module. It is thus apparent that a distributed DRM functionality is not always required by the invention.

Figure 11:
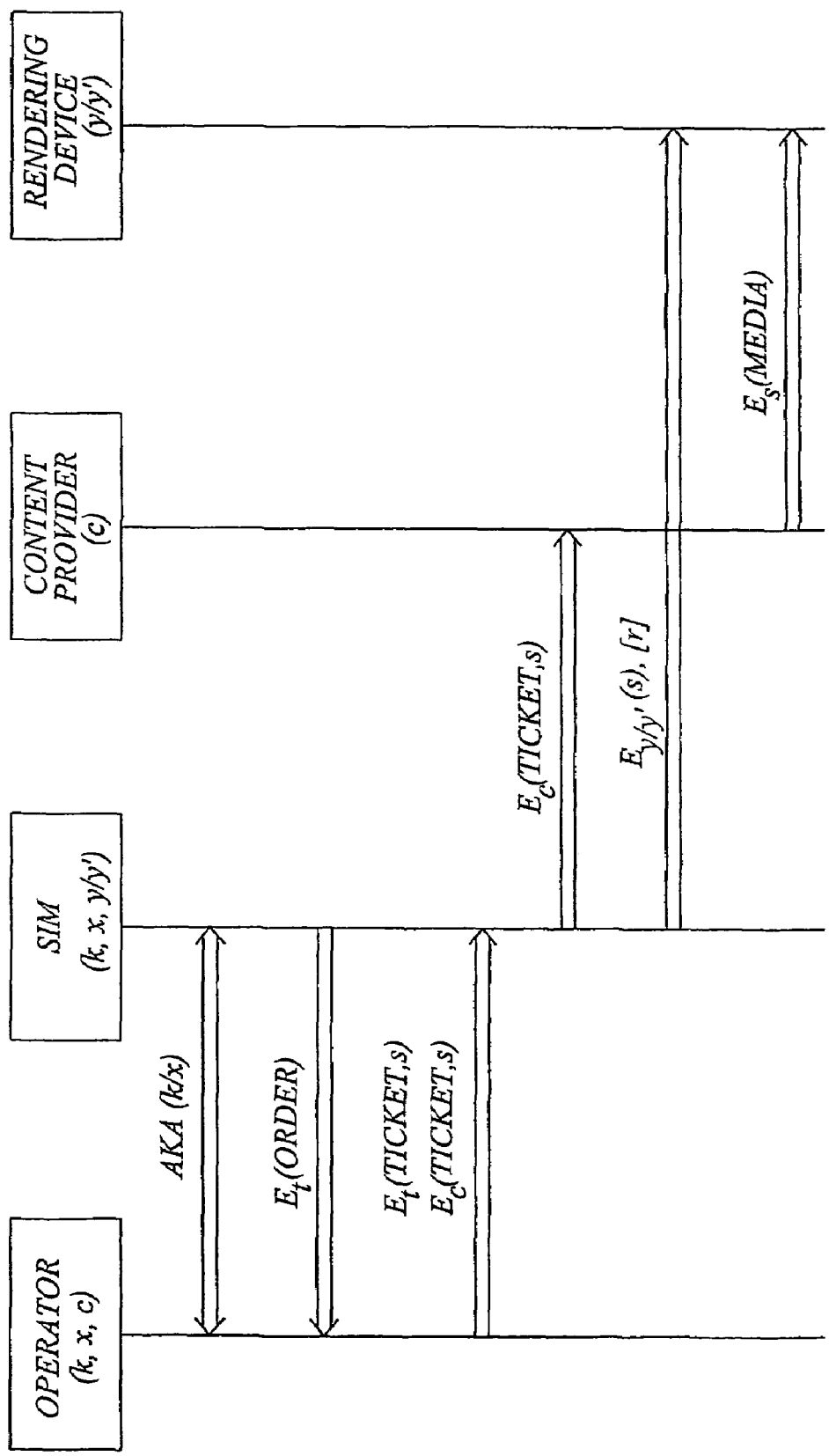
FIG. 11 is a schematic diagram of an example of a DRM protocol involving an operator, a tamper-resistant subscriber identity module, a content provider and a rendering device.

For a more complete understanding of the invention, an exemplary DRM solution will now be described with reference to FIGS. 11 and 12, which schematically illustrate the overall DRM protocol and a corresponding client side block diagram, respectively.

As mentioned, in a DRM solution, part of the DRM processing normally must take place in a tamper resistant device, preferably a tamper-resistant identity module. For a more detailed understanding of the invention, the example of FIGS. 11 and 12 will refer to a network subscriber identity module such as a GSM SIM, USIM, WIM, ISIM card, hereinafter simply referred to as an SIM. Typically, a container is downloaded that comprises key(s) and/or data, and this key(s)/data need to be processed in a protected environment. Here, the processing behavior could be entirely specified by a SAT/USAT or corresponding application, possibly interfacing with the authentication/key generation algorithms preexisting on the card, reusing the operator-subscriber relation. Using SAT in this context is not the same as using a "true" tamper resistant module, but it is more secure than performing the processing in an open and perhaps even hostile PC environment and more flexible than using hard-wired tamper resistant modules. If a security flaw is found, the card is easily upgraded (even over the air) by a new set of DRM processing algorithms.

In this example, it is assumed that the SIM card 120 (FIG. 12) contains k, the usual subscriber key. The SIM also contains an application environment (e.g. SAT/USAT) that is premanufactured with a DRM application, or alternatively, the DRM application is securely (encrypted and authenticated) downloaded. Also, a second key, x, specific for DRM purposes is present in the SIM and at the operator. Like k, also x is stored so that it cannot be read out of the SIM card. Note though that x may be stored in software, e.g. as part of the DRM application, if enough protection can be guaranteed. Besides the network operator, there is a content provider, which, if distinct from the operator, has a contractual agreement with the operator, manifested by a shared key c.

First, and optionally, each time the DRM agent in the SIM is to be invoked, the application verifies that it is running in a trusted environment, e.g. by a mutual authentication protocol. This protocol could be based on knowledge of the key x, or some other information shared between the SIM and the rendering device with which the SIM is related, e.g. another key y. This might be desirable in cases where the whole SIM can be moved between devices, in which case there is one unique key, y, for each device the SIM is used with.

When the user has decided what media he wants (and possibly paid for it, if payment is not done afterwards or during the session), he notifies the network operator that he wishes to use the DRM application, and the operator performs authentication and key-agreement using a random challenge rand, other optional user data, the key x and optionally also the key k. This authentication could optionally have been done before, e.g. when gaining network access. The key k is used when it is necessary or appropriate to tie the key generation to the subscription as such. This AKA is done using some cryptographic functions f and g, which, in case we desire dependence also on k, may partially consist of the normal SIM authentication algorithm.

Figure 12:
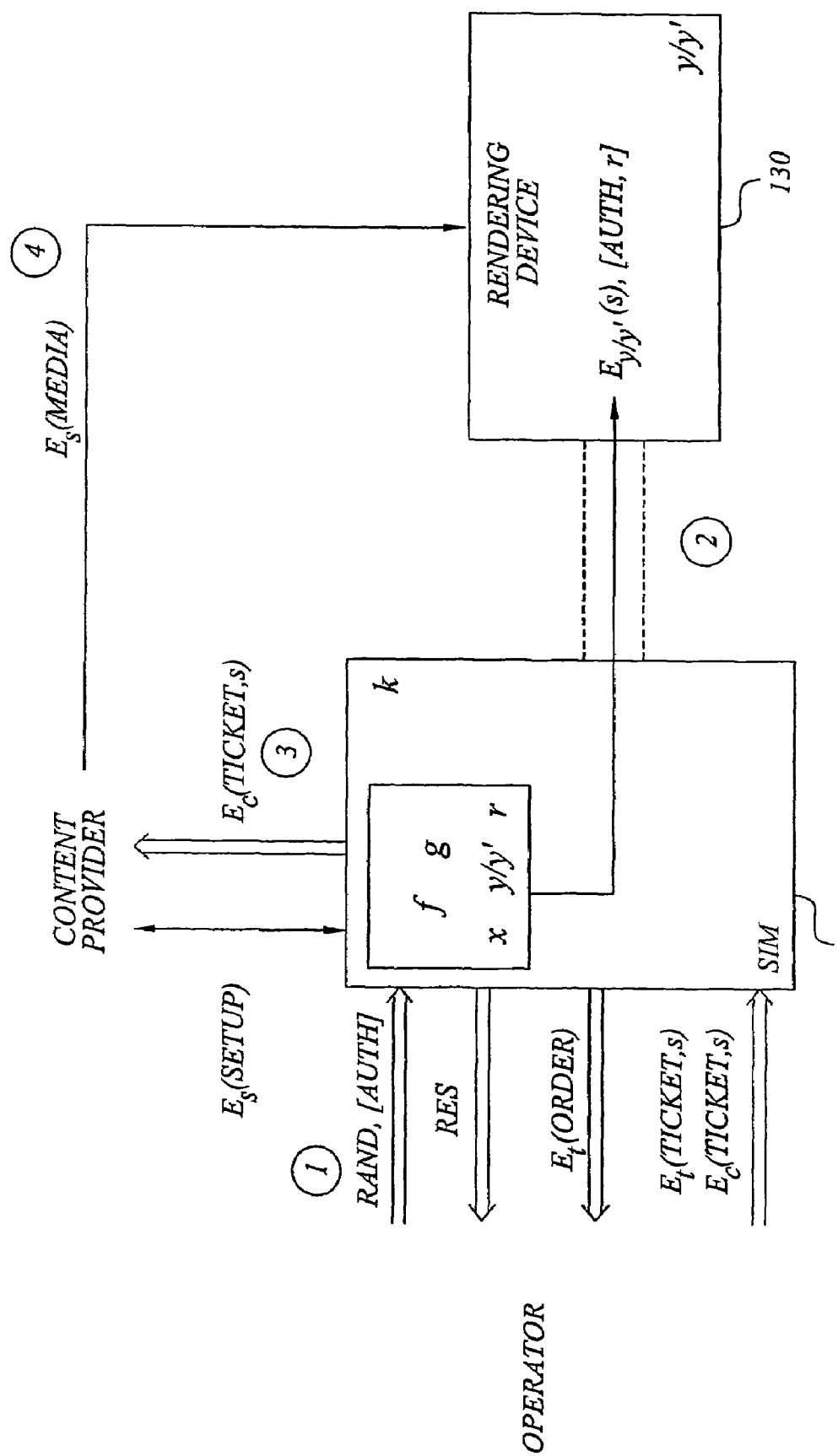
FIG. 12 is a schematic block diagram of relevant parts of a DRM system operating based on the protocol of FIG. 11.

In other words, the operator sends rand (and optional [user-_data], if not already known by the DRM application on the SIM) to the SIM (see (1) in FIG. 12). The information sent is preferably authenticated, e.g. by a key derived from k and/or x in a similar way. The data is received by the DRM application on the SIM, which, if an authentication tag is present, first authenticates the received data, and then runs the same functions f and g to derive the session key, t and the response, RES, respectively. The response is sent back to the operator so that the operator can verify that it is in contact with the right application. Subsequently, the application places an order (protected by the key t) on what media and what rights it wishes to gain to the operator. The order is typically generated by a browser application in the device. Note that the browser application is in this case also a trusted and authenticated application, or the user must be given the possibility to confirm the placed order. The operator returns a session key s, along with a ticket describing the ordered media and rights. This session key is to be later used for the actual media protection. The ticket and the session key s are sent in duplicates. One is protected by the key c (known only to the content provider and the operator), the other is protected by the key t (known only to the client and the operator). The client decrypts the ticket and the key s and checks that the ticket corresponds to the earlier placed order.

The key s can now be output to another application 130 (FIG. 12) in the client device (not necessarily on the SIM itself), or, to a completely stand-alone external device 130 in the overall client system, that using the key s later decrypts the received media and renders it to the user. Note that it may be the case that the actual rendering/decryption is done in another tamper-resistant module, distinct from the SIM. If so, as mentioned above, it might be advisable to establish device-key based communication between that device and the SIM DRM application so that s can be sent encrypted between the SIM and that device (see (2) in FIG. 12), using any of the above proposed solutions. This also, as discussed above, enables the SIM application to authenticate that it is in contact with a tamper resistant device having valid DRM functionality. The SIM could either rely on implicit authentication (i.e. only a device knowing the device key y/y' can decrypt the session key s), or perform an explicit authentication based on the key y/y'. If is desirable to "hide" the actual device key y, and instead derive a device key representation y' to be used for encryption, decryption and/or authentication, the common challenge r has to be transferred from the trusted party to the SIM and also to the rendering device. If the rendering device 130 is "stand-alone" it is recommended that it has its own rule-enforcement and is given the usage rules, for example in the ticket along with the media, so that it can act as an agent on behalf of the content owner/provider and assert that the usage rules are followed. The rule enforcement could alternatively be implemented in the SIM, or distributed between the SIM and the rendering device.

The client next sends the ticket and session key s (still protected by the key c) to the content provider (see (3) in FIG. 12). The content provider removes the protection from the ticket and extracts the key s. If this is successful, the content provider knows that the ticket originated from an operator with whom he has an agreement. If any set-up messages are needed between the client and the content provider prior to sending the media, this traffic is protected by the key s (or some other key derived from s). Finally, the content provider encrypts the media by the session key s, and sends (downloads or streams) it to the rendering device (see (4) in FIG. 12).

It is also possible to let the rendering device authenticate that the media protection key s really comes from a SIM that has been paired with the rendering device through the device key information, y and/or y'.

The ticket-based protocol above is of course not the only possible; many variations exist as can easily be seen by those of ordinary skill in the art.

The invention also fits into current version of the emerging OMA standard (previously known as WAP/WAP-DRM standard). The Wireless Application Protocol (WAP) is standardized by OMA/WAP-Forum. There is currently ongoing work to come up with a way to enforce DRM in the scope of WAP [10, 11]. At present, the standardization work is mainly targeted at download.

The WAP solution separates the media download of a DRM object in two parts: the media object and the rights object. The download can be performed using one of three defined methods:

Forward-lock: The client downloads only the media object. The media object has some simple default rights, e.g. a "preview object", and can not be forwarded to another user.

Combined download: The client downloads both the media object and the rights object.

Separate delivery: The client downloads the media object, which is encrypted with a key CEK (Content Encryption Key). The rights object and CEK can later (or simultaneously) be pushed to the client.

The client is assumed to be an authorized entity, i.e. the device in which it resides can trust that the client behaves in a good way, and obeys any rights imposed by a rights object. No non-authorized entity, e.g. a text-editor or a game that is installed in the device has access to the DRM objects in unencrypted form (possibly not even in encrypted form).

The WAP DRM client defined in [10, 11] may be implemented as an application in an application environment of a tamper-resistant identity module as described above. The WAP-DRM standard, however, assumes that the media rendering device and the download client both resides in the same physical entity. This limitation can be relaxed without violating the WAP-DRM standard by configuring the rending device and the identity module's DRM application by a shared secret key, y, (or properly configured asymmetric key pair) so that the CEK key can be sent in protected form between the identity module and the rendering device.

The Forward-lock and Combined download models specify that the media and rights are downloaded to the DRM client. According to the invention, the rights object may be included in the ticket, and the media object may be downloaded to the rendering device. Note that in this respect there is no real difference between download and streaming. In references [10, 11] that are mainly targeted at download, there is a suggestion to perform streaming by downloading an SDP description of the stream in the media object, and then use that description to set up the streaming session. It poses no problems at all to fit that into the solution proposed by the invention, the SDP description is simply passed inside the ticket. For information on SDP, reference is made to [12]. Preferably, the DRM client implemented in the application environment of the SIM also includes functionality for checking that the forward-lock function of the WAP Protocol is not violated.

The Separate delivery model specifies a way to first download the media object, and then separately download, or rather push, the rights object to the client. The invention can be used also in the implementation of this model. The media object is protected by a Content Encryption Key (CEK). With the notation used in the protocol of the invention, the media protection key s is an instantiation of the CEK. The invention also provides a way to authenticate the download client to the device and vice versa, e.g. based on the key x and/or y(y'). This authentication is left as "out of scope" in [10, 11].

The embodiments described above are merely given as examples, and it should be understood that the present invention is not limited thereto. Further modifications, changes and improvements that retain the basic underlying principles disclosed and claimed herein are within the scope and spirit of the invention.

REFERENCES

[1] A. J. Menezes, P. C. van Oorschot and S. C. Vanstone, "Handbook of Applied Cryptography", Chapters 1, 10 and 11, CRC Press.
[2] L. Kaati, "Cryptographic Techniques and Encodings for Digital Rights Management", Master's Thesis in Computer Science, Department of Numerical Analysis and Computer Science, Royal Institute of Technology, Stockholm University, 2001.
[3] Swedish Patent Application No. 0101295-4 filed Apr. 10, 2001.
[4] "Specification of the SIM Application Toolkit for the Subscriber Identity Module—Mobile Equipment (SIM—ME) interface", 3GGP TS 11.14, ETSI TS 101 267, Technical Specification $3^{rd}$ Generation Partnership Project, Technical Specification Group Terminals, Version 8.10.0, 1999.
[5] "USIM Application Toolkit (USAT)", 3GGP TS 31.111, ETSI TS 131 111, Technical Specification $3^{rd}$ Generation Partnership Project, Technical Specification Group Terminals, Version 4.4.0, Release 4.
[6] "Specification of the Subscriber Identity Module—Mobile Equipment (SIM—ME) interface" 3GPP TS 11.11, ETSI TS 100 977, Technical Specification $3^{rd}$ Generation Partnership Project, Technical Specification Group Terminals, Version 8.5.0, 1999.
[7] "GSM API for SIM Toolkit, Stage 2", 3GGP TS 03.19, ETSI TS 101 476, Technical Specification $3^{rd}$ Generation Partnership Project, Technical Specification Group Terminals, Version 8.4.0, 1999.
[8] "Security Mechanism for SIM Application Toolkit, Stage 2", 3GGP TS 03.48, ETSI TS 101 181, Technical Specification $3^{rd}$ Generation Partnership Project, Technical Specification Group Terminals, Version 8.8.0, 1999.
[9] "Subscriber Identity Modules (SIM), Functional Characteristics", ETSI TS 100 922, GSM 02.17, Technical Specification Digital Cellular Telecommunications system, Version 3.2.0, February 1992.
[10] "Download Architecture Version 1.0", Proposed version 10-Jun.-2002, Open Mobile Alliance.
[11] "Digital Rights Management Version 1.0", Proposed version 28-Jun.-2002, Open Mobile Alliance.
[12] M. Handley, V. Jacobson, "SDP: Session Description Protocol", RFC 2327, April 1998.

The invention claimed is:
1. A tamper-resistant identity module adapted for physical engagement with a client system, the module comprising:
    means for receiving digital content over a network and a digital-content usage device, wherein said tamper-resis- tant identity module comprises a digital rights management (DRM) agent for enabling usage of said digital content; and means for performing at least part of an authentication and key agreement (AKA) procedure, and said DRM agent includes means for performing DRM processing based on information from said AKA procedure.

2. The tamper-resistant identity module according to claim 1, wherein said DRM agent is implemented as an application in an application environment of said tamper-resistant identity module.

3. The tamper-resistant identity module according to claim 2, wherein said DRM agent application is loaded into said identity module application environment from an external trusted party associated with said identity module.

4. The tamper-resistant identity module according to claim 3, wherein said identity module comprises means for authenticating said DRM agent.

5. The tamper-resistant identity module according to claim 1, wherein said DRM agent includes means for extracting a content-protection key to be used for decrypting encrypted digital content provided from a content provider, based on information from said AKA procedure.

6. The tamper-resistant identity module according to claim 1, wherein said DRM agent comprises means for enabling charging for digital content usage.

7. The tamper-resistant identity module according to claim 1, wherein said DRM agent comprises means for managing information related to usage of said digital content, said usage information serving as a basis for charging for digital-content usage.

8. The tamper-resistant identity module according to claim 7, wherein said DRM agent further comprises:

means for integrity protecting said usage information based on an identity-module specific key; and means for sending said integrity protected usage information to an external party managing charging of digital-content usage.

9. The tamper-resistant identity module according to claim 1, wherein said DRM agent implemented in said identity module further comprises means for enabling registration of at least one digital-content usage device.

10. The tamper-resistant identity module according to claim 1, further comprising means for communication between said DRM agent and further DRM functionality implemented in said digital-content usage device based on usage-device specific key information.

11. The tamper-resistant identity module according to claim 10, wherein said communication means is operable for ensuring that only a usage device with valid DRM functionality is enabled to use said digital content.

12. The tamper-resistant identity module according to claim 1, wherein said DRM agent comprises means for receiving, from an external trusted party, a DRM application adapted for use with a digital-content usage device, and means for transferring said DRM application into a tamper-resistant application environment in said digital-content usage device based on usage-device specific key information.

13. The tamper-resistant identity module according to claim 1, wherein said DRM agent implemented in said identity module includes means for checking that the forward-lock function of the Wireless Application Protocol (WAP) is not violated.

14. A client system comprising:

means for receiving digital content over a network;

a digital-content usage device; and a tamper-resistant identity module implemented with a digital rights management (DRM) agent for enabling usage of said digital content by said digital-content usage device;

wherein said identity module further comprises means for performing at least part of an authentication and key agreement (AKA) procedure, and said DRM agent includes means for performing DRM processing based on information from said AKA procedure.

15. The client system according to claim 14, wherein said DRM agent is implemented as an application in an application environment of said tamper-resistant identity module.

16. The client system according to claim 15, wherein said DRM agent application is loaded into said identity module application environment from an external trusted party associated with said identity module.

17. The client system according to claim 16, wherein said identity module comprises means for authenticating said DRM agent.

18. The client system according to claim 14, wherein said DRM agent includes means for extracting a content-protection key to be used for decrypting encrypted digital content provided from a content provider, based on information from said AKA procedure.

19. The client system according to claim 14, wherein said DRM agent comprises means for enabling charging for digital content usage.

20. The client system according to claim 14, comprising means for communication between said DRM agent and a further DRM agent implemented in said digital-content usage device based on usage-device specific key information.

21. The client system according to claim 20, wherein said communication means is operable for ensuring that only a usage device with valid DRM functionality is enabled to use said digital content.

22. The client system according to claim 21, wherein said client system further comprises means for transmitting, to a trusted certification party, identification information associated with said digital-content usage device, and in response thereto receiving a protected representation of said usage-device specific key, and said DRM agent comprises means for extracting said usage-device specific key representation for storage in said tamper-resistant identity module.

23. The client system according to claim 14, wherein said digital-content usage device includes a tamper-resistant application environment, and a DRM application adapted for use as a DRM agent in said usage device is loaded into said application environment at least partly based on usage-device specific key information.

24. The client system according to claim 23, wherein said digital-content usage device comprises:

means for generating new device key information associated with a downloaded DRM application at least partly based on said usage-device specific key information; and means for replacing usage-device specific key information stored in said usage device with said new device key information.

25. The client system according to claim 24, wherein said DRM agent implemented in said identity module comprises means for replacing usage-device specific key information stored in said identity module with key information corresponding to said new device key information.

26. A client system comprising:
a tamper resistant identity module;
a digital-content usage device;
a first DRM agent implemented in the tamper-resistant identity module for engagement with a client device, said first DRM agent comprising means for performing first DRM processing associated with digital content;
a second DRM agent implemented in the digital-content usage device adapted for using said digital content, said second DRM agent comprising means for performing second DRM processing associated with said digital content; and
means for communication between said first DRM agent and said second DRM agent based on usage-device specific key information;
wherein said tamper-resistant identity module comprises means for performing at least part of an authentication and key agreement (AKA) procedure, and said means for performing first DRM processing in said first DRM agent operates based on information from said AKA procedure.

27. The client system according to claim 26, wherein said communication means is operable for ensuring that only a usage device with valid DRM functionality is enabled to use said digital content.

28. The client system according to claim 26, wherein said means for performing first DRM processing in said first DRM agent includes means for extracting a content-protection key to be used for decrypting protected digital content from a content provider, based on information from said AKA procedure.

29. The client system according to claim 28, wherein said communication means is operable for ensuring that said content-protection key is accessible only by a second DRM agent that properly enforces usage rules associated with said digital content.

30. The client system according to claim 29, wherein said means for performing second DRM processing in said second DRM agent comprises means for decrypting encrypted digital content by means of said content-protection key.

31. The client system according to claim 26, wherein said means for performing first DRM processing in said first DRM agent comprises means for enabling charging for said digital content.

32. The client system according to claim 26, wherein said first DRM agent comprises:
means for authenticating said usage device based on said usage-device specific key information to verify that said usage device has valid DRM functionality; and
means for sending DRM data enabling usage of said digital content to said second DRM agent in response to successful authentication of a usage device with valid DRM functionality.

33. The client system according to claim 26, wherein said first DRM agent comprises:
means for encrypting DRM data enabling usage of said digital content, based on said usage-device specific key information; and
means, forming part of said communication means, for sending said encrypted DRM data to said second DRM agent; and
said second DRM agent comprises means for decrypting said encrypted DRM data to enable usage of said digital content, based on said usage-device specific key information.

34. The client system according to claim 26, wherein said tamper-resistant identity module and said usage device are tamper-resistantly configured with usage-device specific key information.

35. The client system according to claim 26, wherein said second DRM agent comprises means for compiling information related to usage of said digital content, and means for transferring said usage information to said first DRM agent based on said usage-device specific key information; and said first DRM agent comprises means for sending said usage information to an external party managing charging of digital-content usage, said usage information serving as a basis for charging for digital-content usage.

36. The client system according to claim 26, wherein said second DRM agent comprises means for sending a first control signal related to the digital-content usage process to said first DRM agent, and said first DRM agent comprises means for processing signal data associated with said first control signal to generate a second control signal, and means for sending said second control signal to said second DRM agent for controlling said digital-content usage process.

37. The client system according to claim 26, wherein said first DRM agent is implemented as an application in an application environment of said tamper-resistant identity module.

38. The client system according to claim 37, wherein said first DRM agent application is loaded into said identity module application environment from an external trusted party associated with said identity module.

39. The client system according to claim 37, wherein said identity module comprises means for authenticating said DRM agent.

40. The client system according to claim 26, wherein said second DRM agent is implemented as an application in a tamper-resistant application environment in said usage device.

41. The client system according to claim 40, wherein said second DRM agent application is loaded into said usage-device application environment at least partly based on said usage-device specific key information.

42. The client system according to claim 41, wherein said digital-content usage device comprises:
means for generating new device key information associated with said downloaded DRM application at least partly based on said usage-device specific key information; and
means for replacing usage-device specific key information stored in said usage device with said new device key information.

43. The client system according to claim 42, wherein said DRM agent implemented in said identity module comprises means for replacing usage-device specific key information stored in said identity module with key information corresponding to said new device key information.

44. A method for digital rights management (DRM) comprising the steps of:
tamper-resistantly configuring a usage device, adapted for using digital content, with a usage-device specific key;
providing a cryptographic representation of said usage-device specific key to a client device associated with said usage device; processing, at a trusted certification party, said cryptographic representation received in a request from said client device to retrieve key information representative of said usage-device specific key;

securely transferring said key information from said trusted certification party to a tamper-resistant identity module in said client device, based on an identity-module specific key; and establishing communication between a first DRM agent in said tamper-resistant identity module and a second DRM agent in said usage device based on the key information transferred to the identity module and the usage-device specific key in said usage device.

* * * * *